(12) United States Patent
Jung et al.

(10) Patent No.: US 8,131,747 B2
(45) Date of Patent: Mar. 6, 2012

(54) LIVE SEARCH WITH USE RESTRICTION

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 82 days.

(21) Appl. No.: 11/376,711

(22) Filed: Mar. 15, 2006

(65) Prior Publication Data

US 2007/0219979 A1    Sep. 20, 2007

(51) Int. Cl.
*G06F 17/30* (2006.01)
*G06F 7/00* (2006.01)

(52) U.S. Cl. ........ 707/769; 707/694; 707/781; 707/955; 715/769

(58) Field of Classification Search .................. None
See application file for complete search history.

(56) References Cited

U.S. PATENT DOCUMENTS

| | | | |
|---|---|---|---|
| 5,546,529 A * | 8/1996 | Bowers et al. | 715/848 |
| 5,873,107 A | 2/1999 | Borovoy et al. | |
| 6,339,838 B1 * | 1/2002 | Weinman, Jr. | 717/104 |
| 6,349,295 B1 | 2/2002 | Tedesco et al. | |
| 6,356,922 B1 | 3/2002 | Schilit et al. | |
| 6,654,806 B2 * | 11/2003 | Wall et al. | 709/225 |
| 6,697,808 B1 * | 2/2004 | Hurwood et al. | 707/10 |
| 6,961,858 B2 * | 11/2005 | Fransdonk | 726/29 |
| 7,496,832 B2 * | 2/2009 | Chen et al. | 715/222 |
| 7,577,665 B2 * | 8/2009 | Ramer et al. | 1/1 |
| 7,698,327 B2 * | 4/2010 | Kapur | 707/706 |
| 2002/0032675 A1 * | 3/2002 | Williamowski et al. | 707/3 |
| 2002/0049686 A1 * | 4/2002 | Chuang et al. | 706/45 |
| 2005/0039033 A1 * | 2/2005 | Meyers et al. | 713/193 |
| 2005/0108200 A1 * | 5/2005 | Meik et al. | 707/3 |
| 2005/0246588 A1 | 11/2005 | Deng et al. | |
| 2006/0011716 A1 * | 1/2006 | Perkowski | 235/375 |
| 2006/0155691 A1 * | 7/2006 | Lowe et al. | 707/3 |
| 2006/0248051 A1 * | 11/2006 | Meyers | 707/3 |
| 2007/0028184 A1 * | 2/2007 | Jang | 715/769 |
| 2007/0157129 A1 * | 7/2007 | Facemire et al. | 715/968 |
| 2007/0179940 A1 * | 8/2007 | Robinson et al. | 707/4 |
| 2007/0198340 A1 * | 8/2007 | Lucovsky et al. | 705/14 |
| 2007/0263010 A1 * | 11/2007 | Sripathi Panditharadhya et al. | 345/619 |

OTHER PUBLICATIONS

Rhodes, B.J. and Maes, P.; "Just-in-time information retrieval agents"; IBM Systems Journal; Bearing a date of 2000; pp. 685-704; vol. 39, Nos. 3 & 4; IBM.

\* cited by examiner

*Primary Examiner* — Greta Robinson
*Assistant Examiner* — James J Wilcox

(57) ABSTRACT

An apparatus, device, methods, computer program product, and system are described that determine a search parameter in association with an operation of an instance of an application, determine a search result based on the search parameter, in association with a use restriction associated with the search result, and provide the search result in association with the instance of the application and in association with the use restriction.

34 Claims, 13 Drawing Sheets

LIVE SEARCH WITH USE RESTRICTION

SUMMARY

An embodiment provides a method. In one implementation, the method includes but is not limited to determining a search parameter in association with an operation of an instance of an application, determining a search result based on the search parameter, in association with a use restriction associated with the search result, and providing the search result in association with the instance of the application and in association with the use restriction. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for determining a search parameter in association with an operation of an instance of an application, the signal bearing medium bearing one or more instructions for determining a search result based on the search parameter, in association with a use restriction associated with the search result, and the signal bearing medium bearing one or more instructions for providing the search result in association with the instance of the application and in association with the use restriction. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to determine a search parameter in association with an operation of an instance of an application, determine a search result based on the search parameter, in association with a use restriction associated with the search result, and provide the search result in association with the instance of the application and in association with the use restriction. In addition to the foregoing, other system aspects are described in the claims, drawings, and text forming a part of the present disclosure.

An embodiment provides a device. In one implementation, the device includes but is not limited to a search system, and the search system includes, but is not limited to, a search system, the search system comprising determination logic operable to determine a search parameter in association with an operation of an instance of an application, search logic operable to determine a search result based on the search parameter, in association with a use restriction associated with the search result, and providing logic operable to provide the search result in association with the instance of the application and in association with the use restriction. In addition to the foregoing, other device aspects are described in the claims, drawings, and text forming a part of the present disclosure.

In addition to the foregoing, various other embodiments are set forth and described in the text (e.g., claims and/or detailed description) and/or drawings of the present description.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein, as defined by the claims, will become apparent in the detailed description set forth herein.

BRIEF DESCRIPTION OF THE DRAWINGS

The use of the same symbols in different drawings typically indicates similar or identical items.

DETAILED DESCRIPTION

Figure 1:
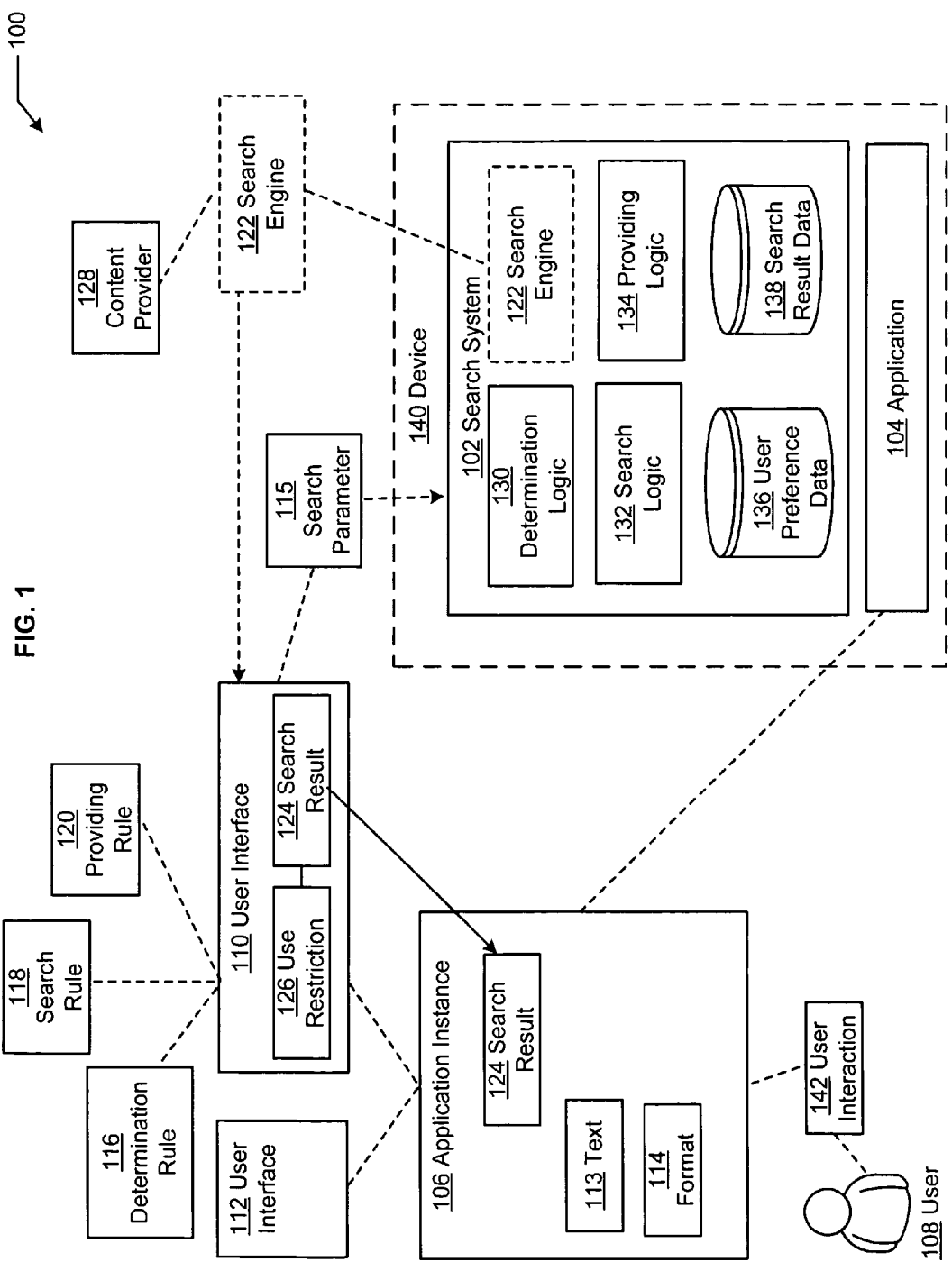
FIG. 1 illustrates an example search system in which embodiments may be implemented, perhaps in a device.

FIG. 1 illustrates an example system 100 in which embodiments may be implemented. The system 100 is operable to provide live searches, such as, for example, searches based on user actions during a preparation of a text, video, or audio file. As such, the system 100 may provide (at least seemingly) real-time or continuous searches during the preparation of the, e.g., text, video, or audio file, and may therefore provide fast, relevant, ongoing, and constantly-updated search results, during the preparation. The system 100 also may be operable to provide the results of such searches for incorporation into the (e.g., text, audio, or video) file that is being prepared, and that serves as the basis of the search. The system 100 is operable to provide such live searches and associated results (including, e.g., providing the results within the file being prepared) in association with a possible restriction on a use of the results, where such a restriction may include, for example, copyright or cost/payment restrictions. Accordingly, the system 100 may be used, for example, to protect and maintain rights of content providers (e.g., providers of the search results), as well as to provide creators of new content with the knowledge that all relevant restrictions associated with the content have been followed.

The system 100 includes a search system 102. The search system 102 may be used to provide some or all of the functionality just described, and/or additional functionality. For example, the search system 102 may be used to determine whether and/or how to perform a live search, as well as whether and/or how to provide results of such a search. The search system 102 may represent software that is installed and executed locally, or may represent software that is accessed (in whole or in part) remotely, e.g., over the Internet or other network.

The search system 102 may interface, or otherwise interact, with an application 104. For example, the search system 102 may make use of exposed Application Program Interfaces (APIs) of the application 104. In other implementations, the search system 102 may not have permission or capability to interface directly with the application 104, and may do so indirectly, e.g., by way of keystroke-capture techniques when the application 104 includes a word processing application.

The application 104 may represent virtually any software application that may be associated with an instance thereof for accepting and/or manipulating data, e.g., an application instance 106. For example, the application 104 may represent a word processing application, a spreadsheet application, a presentation application, a drawing application, an image editing application, a video editing application, an audio editing application, an application for creating a web page, a voice-recognition application, or an email editor. Each such example of the application 104, and other examples, may be associated with a corresponding instance thereof, as should be apparent, e.g., a file having a type or format associated with the application 104. For example, where the application 104 includes a word processing application, the application instance 106 may include a text document. As another example, where the application 104 includes a video-editing application, the instance 106 may include a video file.

Many of the examples provided herein are discussed in terms of a word processing application/instance and/or an image/video editing application/instance. Of course, it should be understood that any of the just-described applications/instances also may be implemented within the search system 100, as well as various other examples of applications/instances, and/or combinations thereof.

Thus, in one example implementation in which the application 104 includes a word processing application and the application instance 106 includes a text document, the application instance 106 may receive data from a user 108, as the user 108 types or otherwise enters data, or otherwise interacts, with the application instance 106. In such examples, the search system 102 may be operable to provide a user interface(s) 110 and 112, e.g., a pane or window.

In some implementations, the user interfaces 110, 112 may be used by the user 108, and by the search system 102, in implementing and using live searches. As such, the user interfaces 110, 112 may be used, for example, to determine whether and/or how to perform a live search, as well as whether and/or how to provide results of such a search, in a manner that is convenient to the user 108, as the application instance evolves during the creation thereof. That is, for example, each of the user interfaces 110, 112 may be associated with a different (e.g., user-defined) type of live search, e.g., a search performed in association with an operation of the instance 106, such as in association with creation of a document when the application 104 includes a word-processing document. Such searches may be, or may appear to the user 108 to be, performed in real-time and in a seemingly continuous fashion, so that the user 108 is constantly being provided with relevant and up-to-date information regarding the document being prepared, as the document is being prepared.

Moreover, by providing a plurality of the user interfaces 110, 112, the search system 102 provides the user 108 with many different types of live searches, having different characteristics and different results (and associated with different uses of those results). For example, the user interface 110 may be associated with a live search based on text 113 entered into the application instance 106, while the user interface 112 may be associated with a live search based on a format 114 of the instance 106 (e.g., the document), such as, for example, a document heading, or an underlining of a word or passage within the instance 106. Of course, many other examples exist, some of which are discussed herein. For example, the user interface 110 may be associated with searches for providing image or video files, while the user interface 112 may be associated with providing sources for footnotes within the application instance 106. For example, the user interface 110 may constantly execute a search that searches for images by impressionist painters of the last city whose name was typed (e.g., presented as thumbnail images within the user interface 110), while the user interface 112 may constantly execute a search associated with quotes from Shakespeare related to recently-typed nouns. Accordingly, as the application instance 106 (e.g., document) is prepared, the contents of the user interfaces 110, 112 may change as search results are updated.

Thus, more generally, the user interface 110, in association with the search system 102, is operable to determine a search parameter 115 in association with the operation of the application instance 106 by the user 108. For example, as the user 108 types the text 113 into the application instance 106, the user interface 110 (and thus the search system 102), may operate to extract certain words or phrases from the text 113, and to use one or more of these word(s)/phrase(s) as the search parameter 115. In other implementations, the user 108 may insert an image into the application instance 106, and the window 112 may be configured to determine the search parameter 115 based on metadata (e.g., a title or source) associated with the image, as determined, e.g., from properties of the image.

In some examples of the system 100 of FIG. 1, the user interface 110 operates to provide desired types of live searches by being associated with one or more rules associated with performing the desired type(s) of live searching. For example, the user interface 110 may be associated with one or more of a determination rule 116, a search rule 118, and/or a providing rule 120. As described in more detail herein, such rules provide for a wide variety of personalization and customization of virtually all aspects of the live searches.

For example, the determination rule 116 may define characteristics of how the search parameter 115 is determined from within the application instance 106. For example, the determination rule 116 may characterize a frequency of the determining of the search parameter 115 (e.g., periodically, after a certain number of minutes), or may characterize an event that initiates the determining of the search parameter 115 (e.g., an ending of a paragraph typed into the application instance 106, or an insertion of quotation marks). Many other aspects and examples of the determining rule are discussed herein.

Somewhat similarly, the search rule 118 characterizes aspects of whether and/or how the search parameter 115, once determined, may be used to perform a search. For example, the search rule 118 may characterize a destination search engine 122 to which the search parameter 115 may be sent.

As shown in FIG. 1, and as described in more detail herein, the search engine 122 may represent, for example, a publicly-available search engine (e.g., an Internet search engine), or a private search engine (e.g., a University or corporate search system restricted to students or employees, respectively). The search engine 122 may be remote from, and separate from, the search system 102, or may be local to, e.g., contained within, the search system 102.

The providing rule 120 characterizes aspects of whether and/or how a search result 124, once obtained (e.g., from the search engine 122), may be provided. The providing rule 120 may govern, for example, both how the search result 124 is provided within the user interface 110, and how the search result 124 is provided to (e.g., incorporated within) the application instance 106. For example, the providing rule 120 may provide the search result 124 within the user interface 110 for a certain amount of time (e.g., before replacing the search result 124 with a subsequent search result provided as the user 108 continues the operation of the application instance 106). As another example, the providing rule 120 may allow for various insertion methods for inserting the search result 124 into the application instance 106, such as, for example, drag-and-drop techniques.

In the system 100 of FIG. 1, the live search provided by the search system 102 in conjunction with the user interface 110 is associated with a (possible) use restriction 126. That is, the use restriction 126 is associated with the search result 124, so that some restriction or limitation is associated with obtaining and/or using the search result 124, or some variation thereof.

For example, the search result 124 may include a video or audio file that is subject to certain copyright or other distribution restrictions. In this case, the providing rule 120 may incorporate, or otherwise access, the use restriction 126 in providing (or not providing) some or all of the search result 124. For example, and again where the search result includes a video file, the providing rule 120 may require that, due to the use restriction, only the first few minutes of the video file may be included in the search result 124. Many other examples of the use restriction 126, and examples of possible effects of the use restriction 126 on the obtaining or providing of the search result 124, are described herein.

Generally, though, inclusion and consideration of the use restriction 126 may allow for the protection of a content provider 128 that is responsible for, or associated with, producing, creating, or distributing the search result 124. For example, the content provider 128 may include a movie or television studio, a song production company, a library, a government agency, a private author, a singer or other artist, or a publishing company. Thus, for example, the content provider 128 may make the search result 124 (e.g., a video file, or copyrighted text) available over the search engine 122, with the knowledge that the search result 124 will not be provided to, e.g., incorporated within, the application instance 106 (without appropriate permissions being obtained).

Moreover, the use restriction 126 may provide peace of mind to the user 108 that the search result is being used in a legal and otherwise permissible manner. For example, the user 108 may represent a student or journalist preparing a paper or article, and the use restriction 126 may help ensure that the student or journalist is not accused of plagiarism or other inappropriate use of the search result 124. For example, the use restriction 126 may include a restriction on inclusion of any quoted material from the content provider 128, where the restriction may include, for example, the requirement of quotation marks and/or a footnote citing a source of the search result 124.

Thus, the determination rule 116, the search rule 118, and the providing rule 120 are each associated with, and customizable for, the user interface 110, and are operable to obtain and/or provide the search result 124 in association with the use restriction 126. As should be understood, although not specifically illustrated in FIG. 1, the user interface 112, and/or other user interfaces, also may be associated with corresponding, customized rules. Thus, the search system 102 is operable to provide a plurality of user interfaces, each customizable for a different type of live search, so as to provide the user 108 with a wide variety of searches, as well as options for using the results of those searches.

In so doing, in the example of FIG. 1, the search system 102 includes determination logic 130, search logic 132, and providing logic 134, which are associated, respectively, with the determining rule 116, the search rule 118, and the providing rule 120, as well as with corresponding rules associated with the user interface 112. In other words, the search system 102 provides the user interfaces 110, 112 for the application instance 106 (and perhaps other instances, not shown), and provides associated live searches with each window that are highly-customizable and useful to the user 108, while protecting the rights of the content provider 128.

In providing such customizable live searches, the search system 102 may store and access user preference data 136 that is operable to store preferences of the user 108 regarding whether and how the live searches are provided, including, for example, how many user interfaces (e.g., the user interfaces 110, 112) are provided, as well as preferences regarding the various rules associated with each of the user interfaces 110, 112. Such preference(s) may thus apply to all of the user interfaces 110, 112 (e.g., preferences regarding how often the user interfaces 110, 112 are updated, or preferences regarding a size or placement of the user interfaces 110, 112), while other preferences may apply only to an individual one of the user interfaces 110, 112 (e.g., a desired file format of the search result 124, or an automated incorporation rule associated with the providing rule 120 for incorporating the search result into the application instance 106).

The search system 102 also may include a search results data memory 138 that is operable to store some or all of the search results associated with the user interfaces 110, 112. For example, where the application instance 106 includes a text document, the user interfaces 110, 112 may constantly be updated as the user 108 types the text document, so that the search result 124 is replaced by a subsequent search result. By storing the search result 124 in the search results data memory 138, however, the user 108 may scroll back through the application instance 106, e.g., through the text document, and may view search results within the user interfaces 110, 112 that correspond to the portion of the application instance 106 which resulted in the obtaining of those search results. In some implementations, all of the search results for the application instance 106 may be stored in the search results data memory 138, perhaps in association with the application instance 106 (e.g., document) itself. In this way, the user 108, or other user, may later "play back" the associated search results any or every time that the application instance is viewed.

As described herein, the search system 102 may be stored and executed locally to the application 104, so that, for example, both the search system 10 and the application may be stored and/or executed on a single device 140, such as, for example, a personal computer, laptop, personal digital assistant (PDA), image player, or audio/video player. In other implementations, as also references, the search system 102 may be stored remotely from the application 104. For example, the search system 102 may be a web-based system that is accessed by the application 104 over the Internet. In still other implementations, the search system 102 may be integrated with the application 104, and/or with other applications.

In still other implementations, the search system 102 may be associated with, e.g., may interface with, multiple applications (and corresponding application instances), in which case the search system 102 may implement the user interfaces 110, 112 (and the associated determination rule 116, the search rule 118, and the providing rule 120) based on the plurality of applications (and instances). For example, the user 108 may simultaneously operate both a text document and a video player. In such cases, the determination rule 116 may be associated with the video player application, and may determine the search parameter 115 from a playing of a video file therewith. Meanwhile, the search rule 118 and the providing rule 120 may be associated with the text document, so that the search result 124 and the use restriction 126 are provided in association therewith.

Many other implementations exist, some of which are described in more detail herein. For example, in addition to determining the search parameter 115 based on the text 113 or format 114, the search system 102 (e.g., the determination logic 130) may determine the search parameter 115 based on, for example, a user interaction 142 with the application instance 106. For example, such user interactions may include a "help" request by the user 108, or may include a scrolling-through of the application instance 106 (e.g., document) by the user 108.

Further, although the search system 102 may be described above primarily with respect to the user interfaces 110, 112, it should be understood that other techniques exist and may be used for providing live searches subject to use restrictions. For example, the search result 124 and/or the use restriction 126 may be provided in a pop-up window that is displayed within the application instance 106 in proximity to a portion thereof which initiated the live search (e.g., in proximity to the text 113). Then, the user 108 may incorporate the search result 124 by selecting the pop-up window.

Figure 2:
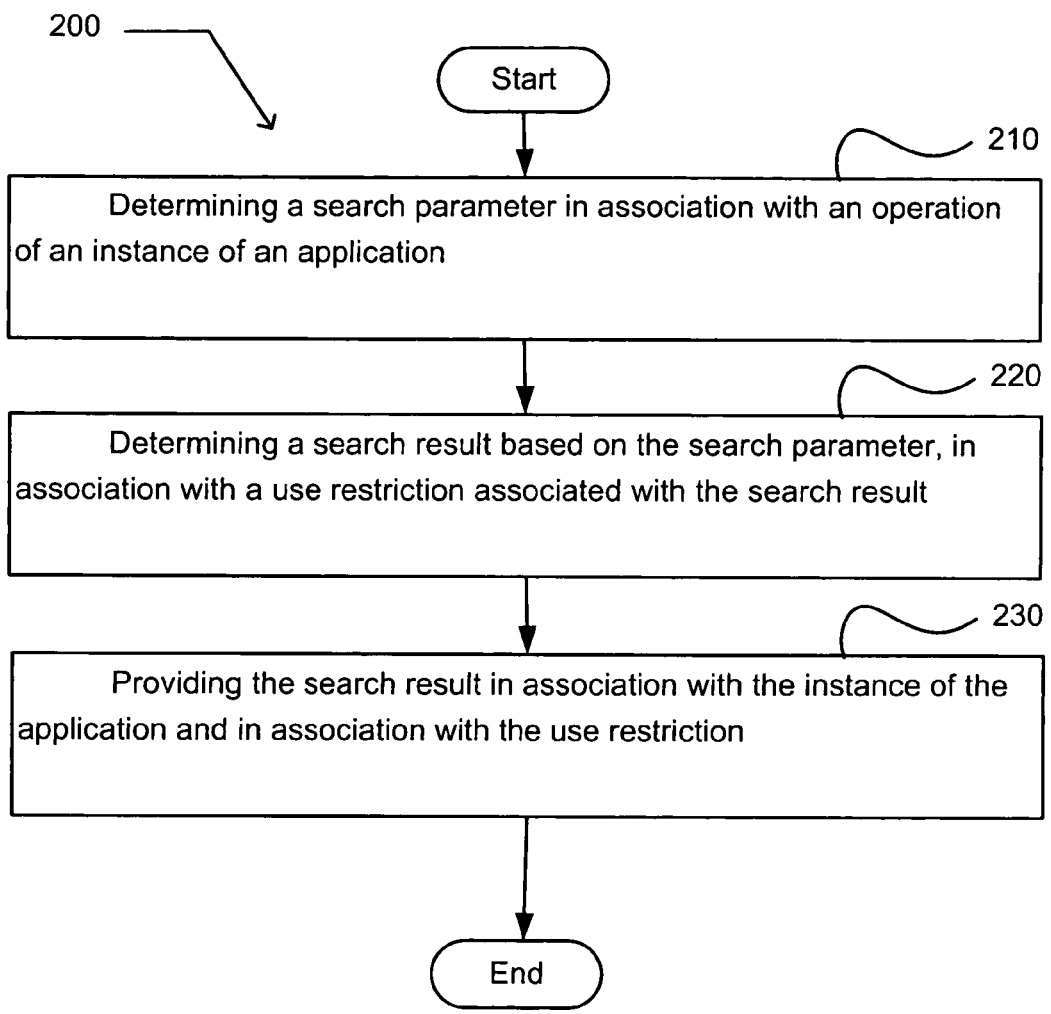
FIG. 2 illustrates an operational flow representing example operations related to techniques for live searches with use restrictions.

FIG. 2 illustrates an operational flow 200 representing example operations related to live searches with use restrictions. In FIG. 2 and in following figures that include various examples of operational flows, discussion and explanation may be provided with respect to the above-described example of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those which are illustrated, or may be performed concurrently.

After a start operation, the operational flow 200 moves to a determining operation 210 in which a search parameter may be determined in association with an operation of an instance of an application. For example, as shown in FIG. 1, the search system 102 may be operable to determine the search parameter 115 in association with the operation of the application instance 106 of the application 104, by the user 108. In a more specific example, the user interface 110 may be associated with, e.g., may implement, the determination rule 116, in accordance with the determination logic 130 and/or the user preference data 136.

Then, in a determining operation 220, a search result may be determined based on the search parameter, in association with a use restriction associated with the search result. For example, the search system 102 may determine the search result 124, based on the search parameter 115 and in association with the use restriction 126. For example, the search rule 118 and/or the search logic 132 may execute a search based on the search parameter, and may determine the use restriction 126 in conjunction therewith, e.g., by examining the search result 124, or by executing a separate search or query, e.g., of the content provider 128.

In a providing operation 230, the search result may be provided in association with the instance of the application and in association with the use restriction. For example, the search system 102 may provide the search result 124 by, for example, providing the search result 124 within the user interface 110, or by providing the search result 124 within a pop-up window within the application instance 106. The search system 102 may further provide the search result by defining and implementing incorporation or annotation rules defining a manner in which the user 108 may (or may not) make use of the search result 124 within the application instance 106, e.g., subject to the use restriction 126.

As a result of the operations 210-230, operation(s) may be performed that are related either to a local or remote storage of digital data, and/or to transmission of digital data. As discussed herein, in addition to accessing, querying, recalling, obtaining, or otherwise determining the digital data for the providing operation, operations may be performed related to storing, assigning, associating, or otherwise archiving the digital data to a memory, including, for example, sending and/or receiving a transmission of the digital data from a remote memory. Accordingly, any such operation(s) may involve elements including at least an operator (e.g., either human or computer) directing the operation, a transmitting computer, and/or a receiving computer, and should be understood to occur within the United States as long as at least one of these elements resides in the United States.

Figure 3:
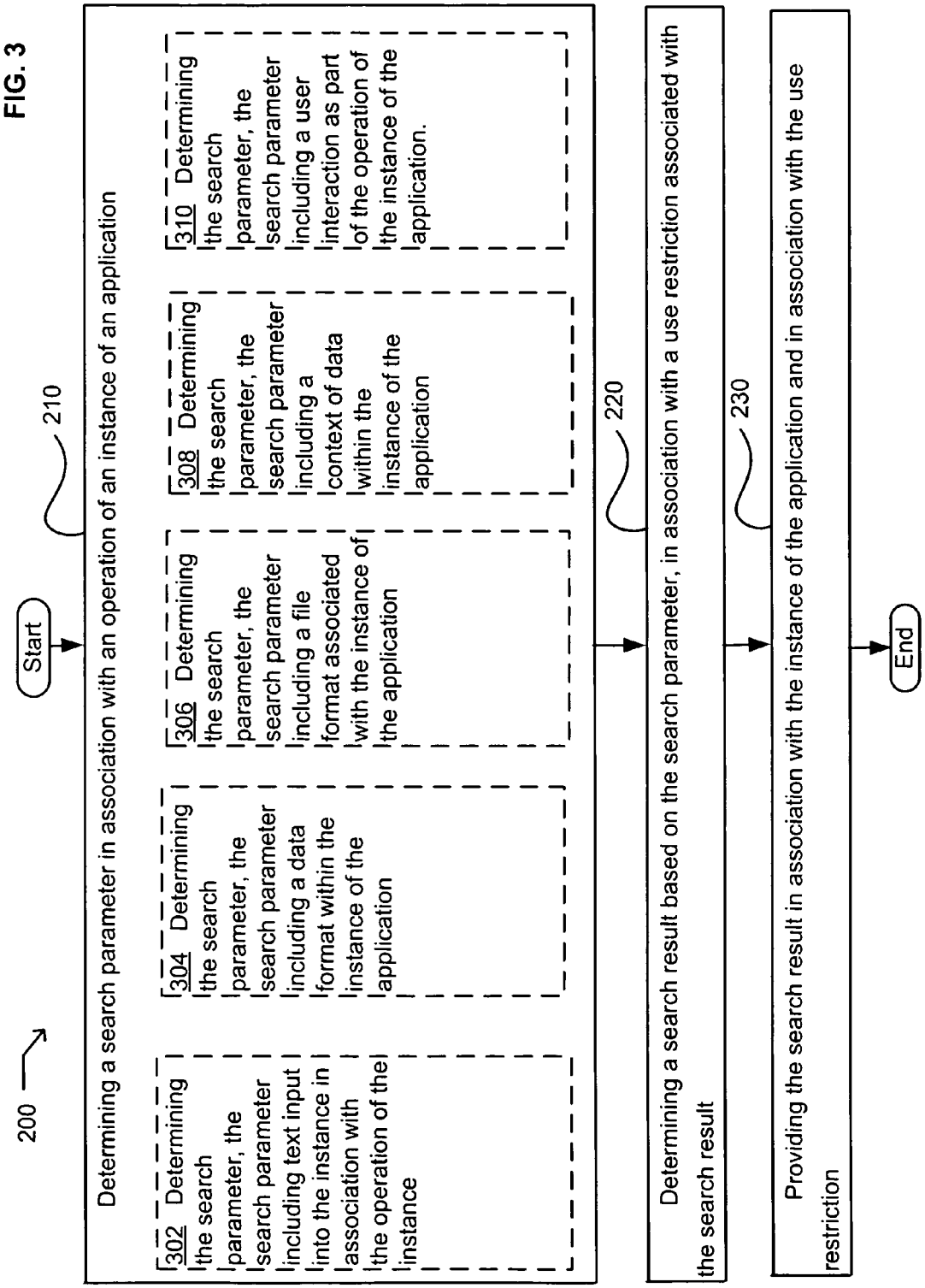
FIG. 3 illustrates an alternative embodiment of the example operational flow of FIG. 2.

FIG. 3 illustrates alternative embodiments of the example operational flow 200 of FIG. 2. FIG. 3 illustrates example embodiments where the determining operation 210 may include at least one additional operation. Additional operations may include an operation 302, an operation 304, an operation 306, an operation 308, and/or an operation 310.

At the operation 302, the search parameter may be determined, the search parameter including text input into the instance in association with the operation of the instance. For example, where the application instance 106 includes a word processing document, the user 108 may enter text 113 into the instance 106. Then, for example, the determination logic 130 may be operable to extract the text 113 for use as the search parameter 115. In some implementations, the text 113 may include, for example, the most recent words typed, a most-recent heading, or a most-recently typed city name, or may include words (or categories of words) specified in the user preference data 136.

At the operation 304, the search parameter may be determined, the search parameter including a data format within the instance of the application. For example, the determination logic 130, e.g., the determination rule 116 of the user interface 110, may determine the format 114 of the application instance 106. In another example in which the application instance 106 includes a document of the (e.g., word processing) application 104, the format 114 may include one or more headings within the document, or may include any underlining, capitalization, quotation mark or other punctuation, or a line/page number associated with the document.

At the operation 306, the search parameter may be determined, the search parameter including a file format associated with the instance of the application. For example, the search system 102, e.g., the determination logic 130, may determine the search parameter 115 based on a file format of the application instance 106, which may include, for example, a video, audio, image, or document file format. For example, the user preference data 136 may specify a certain type of search to be performed in response to a certain word, and may further specify variations on the search(es) depending on whether the specified word appears within a text document file or a video file.

At the operation 308, the search parameter may be determined, the search parameter including a context of data within the instance of the application. For example, the determination rule 116 may be associated with determining contextual information about data, e.g., the text 113, within the application instance 106. For example, such contextual information may include a use or aspect of the text 113, such as whether the text 113 includes a noun or a verb, or whether the text 113 is used in a quotation, or is used in a vicinity of an inserted image. Contextual information also may be associated with a subject of a paragraph or page, and, as such, may be associated with disambiguation of the text 113, e.g., specifying one meaning of a word that has a plurality of meanings, or may be associated with specifying a characteristic of an entity associated with a word (e.g., specifying a particular company as a competitor, customer, or supplier).

At the operation 310, the search parameter may be determined, the search parameter including a user interaction as part of the operation of the instance of the application. For example, the search system 102 may determine the user interaction 142 as being associated with the search parameter 115. In some implementations, then, the user interaction 142 may include a deleting, copying, or pasting of data within the instance 106, or may include operations such as, for example, performing a "find" operation for a particular word or phrase.

Figure 4:
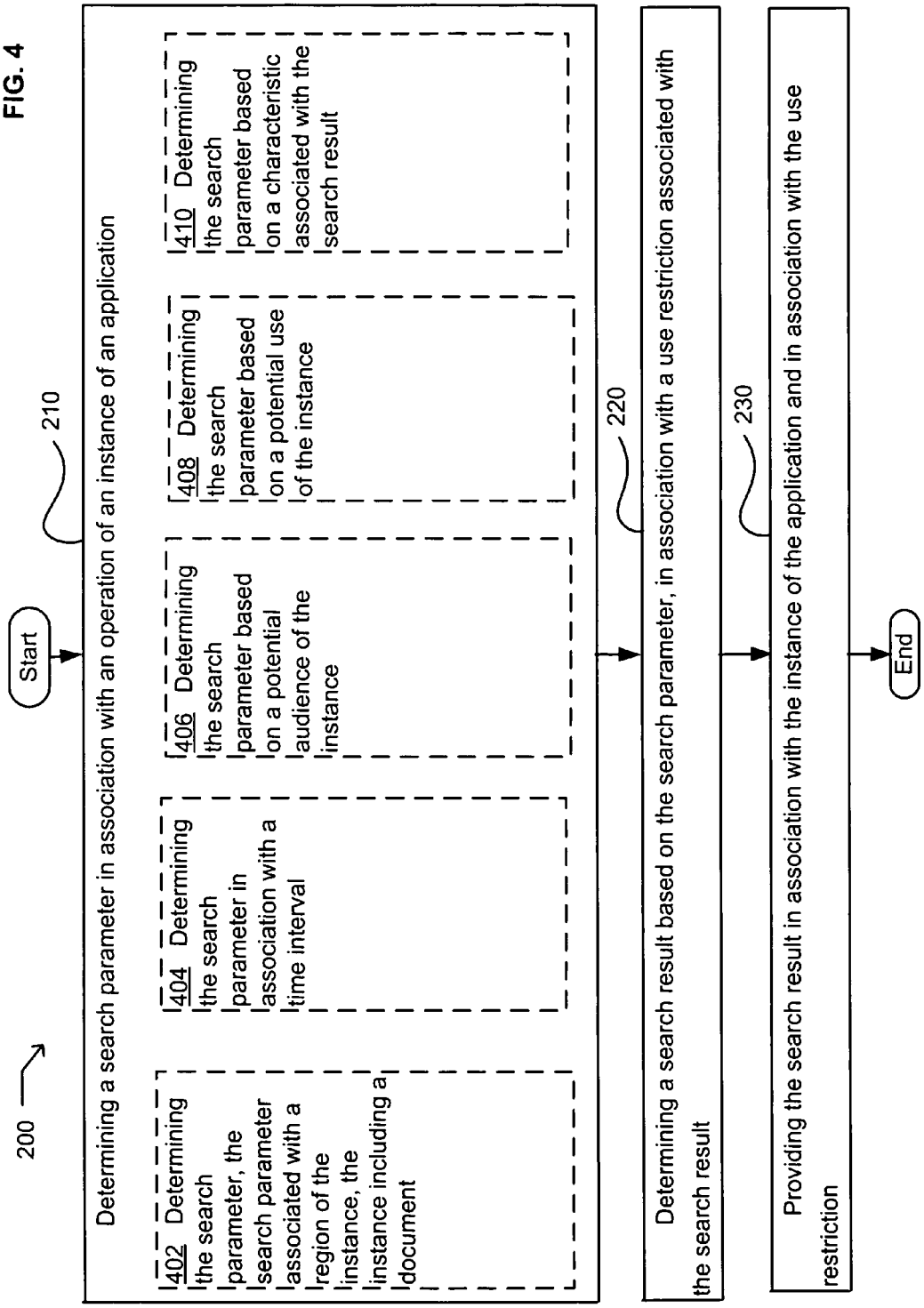
FIG. 4 illustrates an alternative embodiment of the example operational flow of FIG. 2.

FIG. 4 illustrates alternative embodiments of the example operational flow 200 of FIG. 2. FIG. 4 illustrates example embodiments where the determining operation 210 may include at least one additional operation. Additional operations may include an operation 402, an operation 404, an operation 406, an operation 408, and/or an operation 410.

At the operation 402, the search parameter may be determined, the search parameter associated with a region of the instance, the instance including a document. For example, where the application instance 106 includes a document (e.g., where the application 104 includes a word processing application), the determination rule 116 may specify a region of the document from which, or based on which, the search parameter 115 is determined. For example, such a region may be defined with respect to another aspect of the document, such as, for example, an inserted image (e.g., the determination rule 116 may determine that the search parameter 115 includes any text within a region just above or just below an inserted image). In another example, a region of the document may include a header or footer of the document, or may include a region within ten lines of a new section of the document, or may include a region associated with a beginning or end of the document.

At the operation 404, the search parameter may be determined in association with a time interval. For example, the search system 102 may specify a periodic time interval, e.g., every five minutes, at which the search parameter 114 is determined. Of course, the time interval need not be periodic, and may be, e.g., randomly selected within a window. In some implementations, the time interval may be specific to each one of the user interfaces 110, 112, while in other implementations, the time interval may be substantially the same for all searches being performed.

At the operation 406, the search parameter may be determined based on a potential audience of the instance. For example, the user 108 may include a student, and instances of the application 104 may include a first document produced for submission as part of a class assignment, and may include a second document produced in association with a blog of the user (student) 108 that is generally expected to be read by friends of the user (student) 108. In such cases, the user preference data 136 may specify different instances of the determination rule 116, so that the search parameter 115 is determined differently in each case, based on the audiences of the documents produced. As a result, the search parameter 115 (and the resulting search result 124, use restriction 126, and/or incorporation or use thereof) may be different in each case, even when content of the document is the same.

At the operation 408, the search parameter may be determined based on a potential use of the instance. For example, a use of the instance 106 may include strictly personal use, or may include a publication of a resulting document in a magazine or book, or may include a posting of the resulting document on the Internet. Therefore, again, the determination logic 130 may determine the search parameter 115 differently in each of these settings. Moreover, as described in more detail herein, the different potential use(s) of the instance 106 may correspond to different aspects of the search result 124 and/or the use restriction 126, since, for example, the use of the search result 124 may be permissible for personal use of the user 108, but may be partially or wholly impermissible (at least without providing payment or otherwise obtaining permission) when using the search result in other contexts (e.g., as part of a published work).

At the operation 410, the search parameter may be determined based on a characteristic associated with the search result. For example, the search result 124 may be (desired to be) associated with a particular type of file or format, such as an image, audio, video, or text format, or may be associated with a certain type of use restriction (e.g., a use restriction on complete or unfettered use of the search result 124, but that allows a partial or restricted use thereof). For example, if the user 108 desires that the search result 124 includes audio files, then the determination rule 116 may determine the search parameter 115 including names of bands or other singing artists. As another example, where the search result is desired to include a characteristic such as including quotations from certain source (e.g., the Bible), the search parameter may be determined/specified accordingly.

Figure 5:
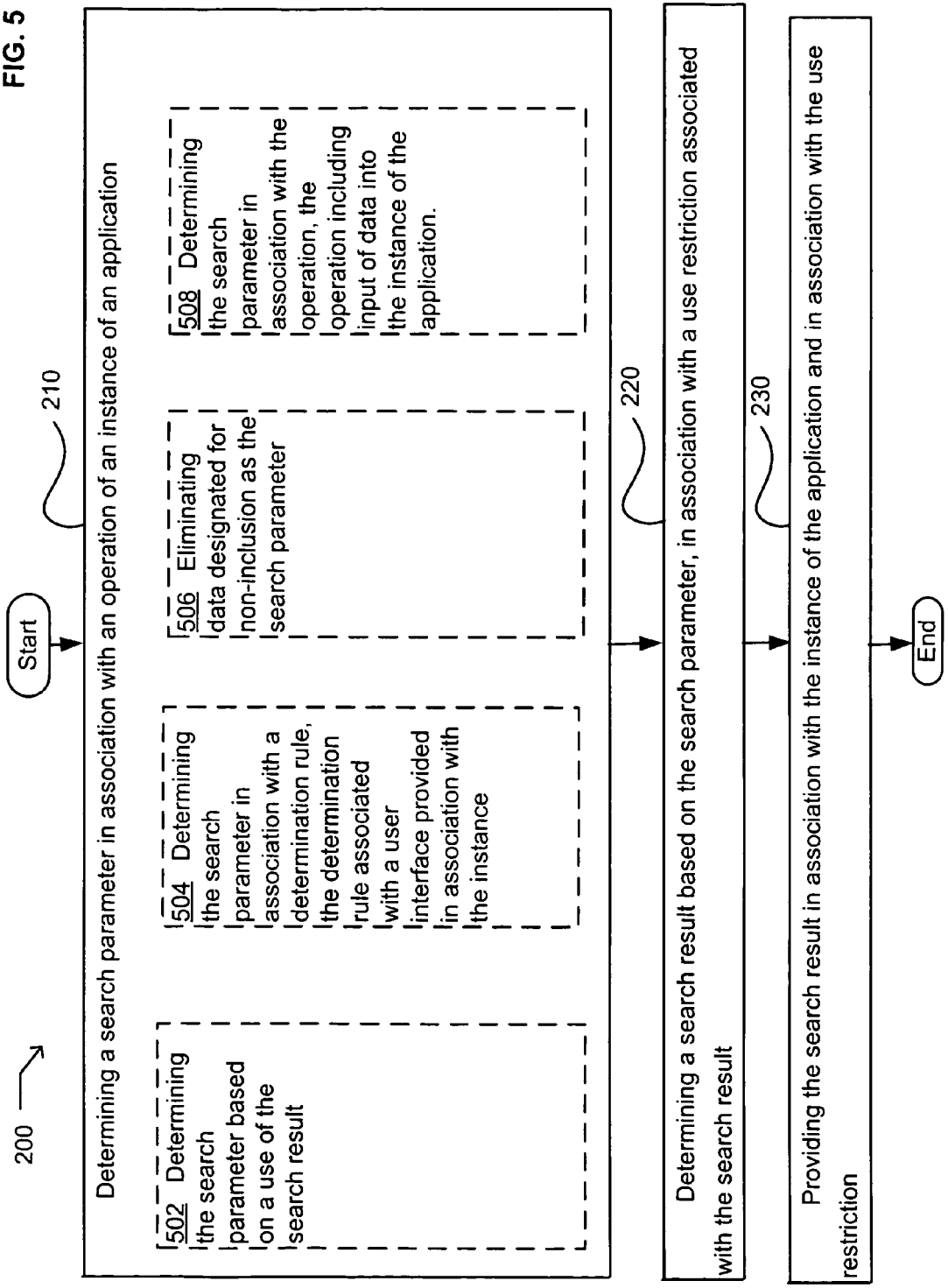
FIG. 5 illustrates an alternative embodiment of the example operational flow of FIG. 2.

FIG. 5 illustrates alternative embodiments of the example operational flow 200 of FIG. 2. FIG. 5 illustrates example embodiments where the determining operation 210 may include at least one additional operation. Additional operations may include an operation 502, an operation 504, an operation 506, and/or an operation 508.

At the operation 502, the search parameter may be determined based on a use of the search result. For example, the user may intend to use the search result 124 by incorporating the search result 124 directly into the application instance 106, or may intend to use the search result as a citation in a footnote of the application instance 106. In such cases, the determination logic 130 may determine the search parameter 115 accordingly. For example, the determination rule 116 may specify a certain (e.g., very low) level of the use restriction 126, in the case where the search result 124 is to be provided directly into the application instance 106. As another example, the determination rule 116 may specify that the search parameter 115 include an phrase or word that is in quotes within the application instance 106, in the case where the search system 102 is desired to provide automatic annotation of the application instance 106 (e.g., to provide automatic footnotes providing citations for source(s) of the search result 124).

At the operation 504, the search parameter may be determined in association with a determination rule, the determination rule associated with a user interface provided in association with the instance. For example, the search system 102 may determine the search parameter 115 in association with the determination rule 116 associated with the user interface 110. As described, each of the user interfaces 110, 112 (e.g., windows, panes, or other interfaces for providing a viewing and/or use of the search result 124) may be associated with a different determination rule, so that the user 108 may obtain the benefit of a plurality of different searches being run simultaneously and in accordance with different search criteria.

At the operation 506, data designated for non-inclusion as the search parameter may be eliminated. For example, the determination logic 130 may determine, e.g., from the user preference data 136, that certain words, phrases, images, or sounds (e.g., of audio files) should not be included as the search parameter 115. As such, the determination rule 116 may automatically remove such data from consideration as the search parameter.

At the operation 508, the search parameter may be determined in association with the operation, the operation including input of data into the instance of the application. For example, the determination rule 116 may determine the search parameter 115 in association with a typing or other data entry technique employed by the user 108 to enter data into the application instance 106 (e.g., a text document). Similarly, in other implementations, data input into an image or video-editing instance(s) during operation thereof may be used in determining the search parameter 115. For example, the data may include a new video clip or a new image that is/are input into the instance 106 of the (editing) application 104, during operation of the (editing) application 104.

Figure 6:
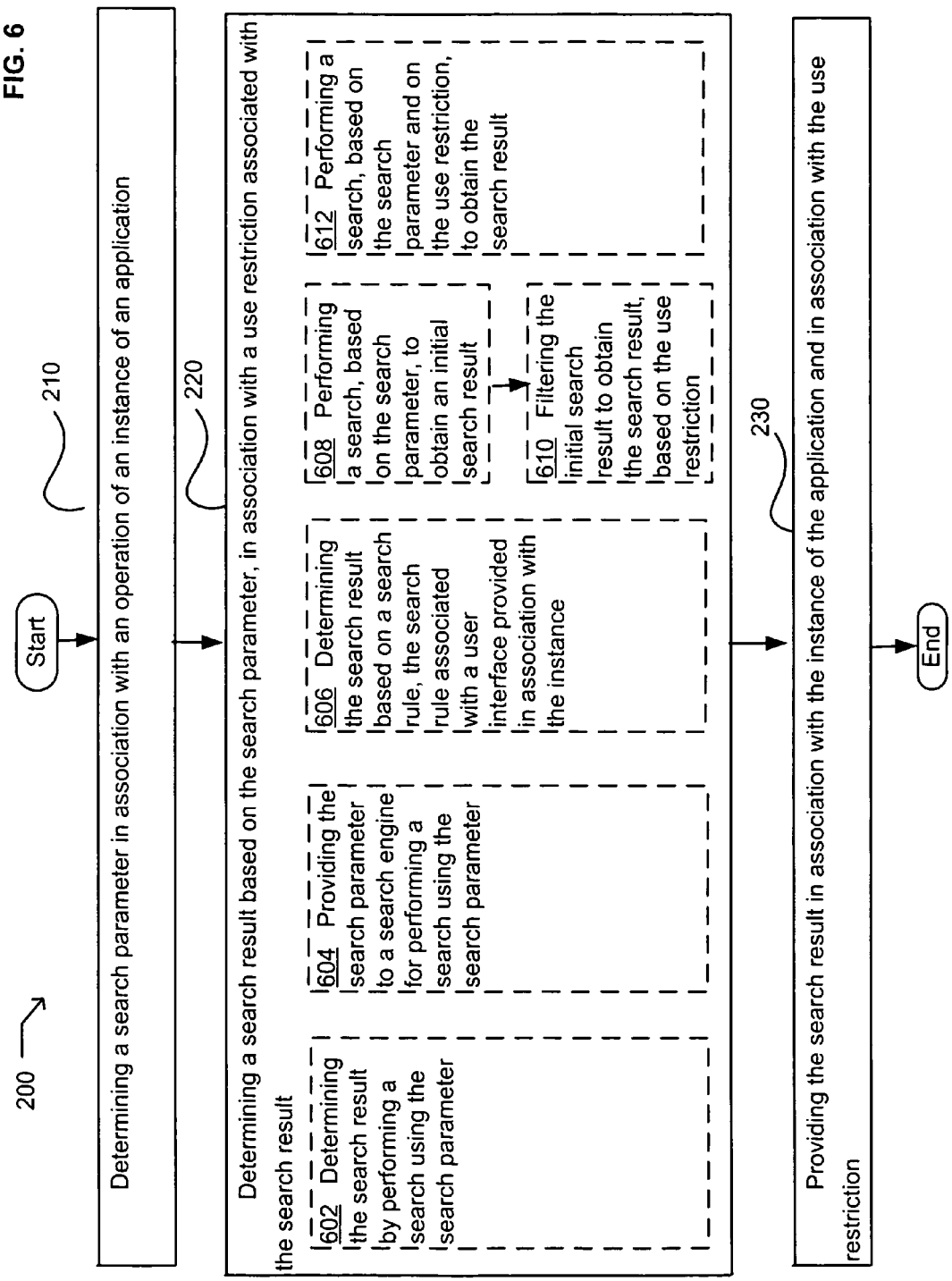
FIG. 6 illustrates an alternative embodiment of the example operational flow of FIG. 2.

FIG. 6 illustrates alternative embodiments of the example operational flow 200 of FIG. 2. FIG. 6 illustrates example embodiments where the determining operation 220 may include at least one additional operation. Additional operations may include an operation 602, an operation 604, an operation 606, an operation 608, an operation 610, and/or an operation 612.

At the operation 602, the search result may be determined by performing a search using the search parameter. For example, the search system 102 may perform a search of locally-available documents or other data, or may use the external search engine 122 to perform the search.

At the operation 604, the search parameter may be provided to a search engine for performing a search using the search parameter. For example, as just described, the search system 102 may transmit the search parameter 115 to the search engine 122, which may be located remotely from the search system 102, e.g., over a wide area network, or which may be located locally to the search system 102.

At the operation 606, the search result may be determined based on a search rule, the search rule associated with a user interface provided in association with the instance. For example, the search system 102, e.g., the search logic 132, may associate the search rule 118 with the user interface 110 that is provided in association with the application instance 106. For example, where the application 104 is a word processing application and the application instance includes a text document, the user interface 110 may be provided as a pop-up window or pane that is overlaid on a user interface (e.g., text editor) of the application instance 106 itself. The user 108 may thus move/position (e.g., drag) the user interface 110 in any desired manner around a screen that is displaying the user interface for the application instance 106. Since the search rule 118 may be associated specifically with the user interface 110, it should be understood that a type of search (e.g., an associated search engine, search query, or number of search results to be obtained) may be customized for the user interface 110.

At the operation 608, a search may be performed, based on the search parameter, to obtain an initial search result. For example, the search logic 132 may forward the search parameter 115 to the search engine 122, and may obtain an initial search result therefrom. At the operation 610 the initial search result may be filtered to obtain the search result, based on the use restriction. For example, the search logic 132 and/or the providing logic 134 may obtain the use restriction in conjunction with, or separately from, the initial search result (e.g., by obtaining the initial search result from the search engine 122, and/or from the content provider 128, perhaps in a separate communication that is initiated by the search logic 132). Then, the search logic 132 and/or the providing logic 134 may filter the initial search result, based on the use restriction, to obtain the search result 115. For example, the search parameter 115 may specify a query for content to be used in a document (e.g., the application instance 106) that is to be published in a magazine. Accordingly, the search logic 132 may obtain a listing of multiple examples of such content as the initial search result. However, a use restriction may be associated with one or more of the examples of the content, the use restriction preventing such examples from inclusion in a magazine article (without further permission, e.g. payment). Then, the search logic 132 may apply a filter to remove such examples from the initial search results, so that the search result 124 includes only those examples of the desired content that may permissibly be included within the document (application instance 106). In this way, for example, the user 108 only views content within the user interface 110 that may be included within the document being prepared (e.g., the application instance 106).

At the operation 612, a search is performed, based on the search parameter and on the use restriction, to obtain the search result. For example, the search logic 132 may formulate a query that specifies or includes both the search parameter 115 and the use restriction 126. In this way, the search result 124 includes only those search results that are associated with, or comply with, the use restriction 126. In such implementations, then, filtering of search result(s) (such as described above with respect to the operations 608, 610) may not be necessary.

Figure 7:
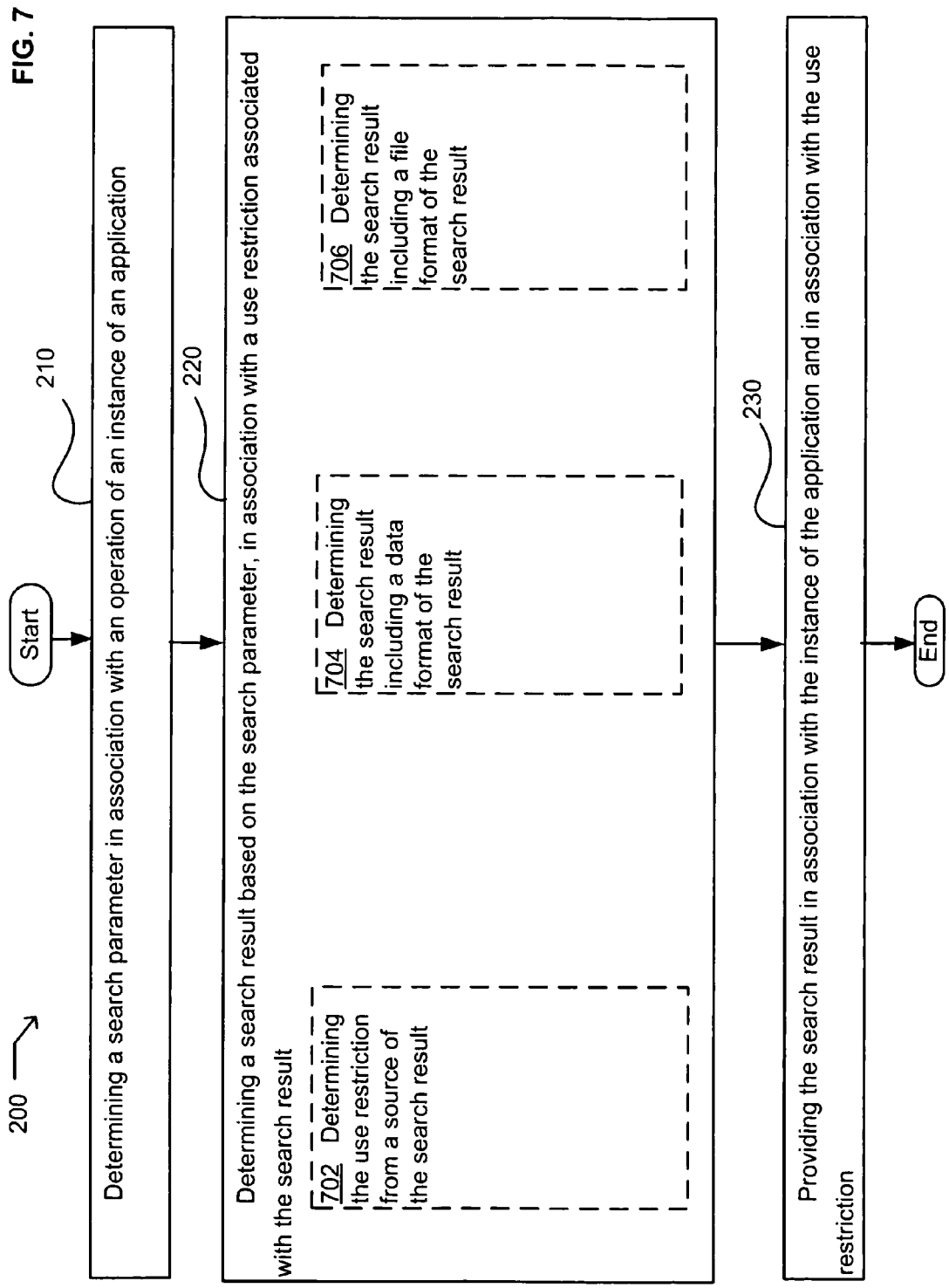
FIG. 7 illustrates an alternative embodiment of the example operational flow of FIG. 2.

FIG. 7 illustrates alternative embodiments of the example operational flow 200 of FIG. 2. FIG. 7 illustrates example embodiments where the determining operation 220 may include at least one additional operation. Additional operations may include an operation 702, an operation 704, and/or an operation 706.

At the operation 702, the use restriction may be determined from a source of the search result. For example, the search logic 132 may perform a search based on the search parameter 115, and the search may involve an included or separate query for the use restriction 126. For example, the search parameter 115 may include an author's name, and the search logic 132 may perform an Internet-based search to determine works associated with the author, while simultaneously performing a search (or otherwise initiating an inquiry) regarding any use restrictions that may be associated with one or more of the works of the author in question, perhaps by querying the content provider 128.

At the operation 704, the search result may be determined including a data format of the search result. For example, the user 108 may specify that only direct quotations should be included in the search result 124, or that the search result 124 should only include bibliographic information that has a certain format (e.g., a format such as, "author, title, source, publication date) and is therefore useful in creating a footnote or bibliography for the application instance 106 (e.g., document).

At the operation 706, the search result may be determined including a file format of the search result. For example, the search logic 132 may specify that only certain types of file formats should be included in the search result 132. For example, although the user interface 110 and the user interface 112 each may specify the same search parameter 115, the former may be associated with the search rule 118 specifying that only text documents should be returned as the search result 124, while the latter may be associated with a different search rule that specifies that only video files should be returned as part of corresponding search results.

Figure 8:
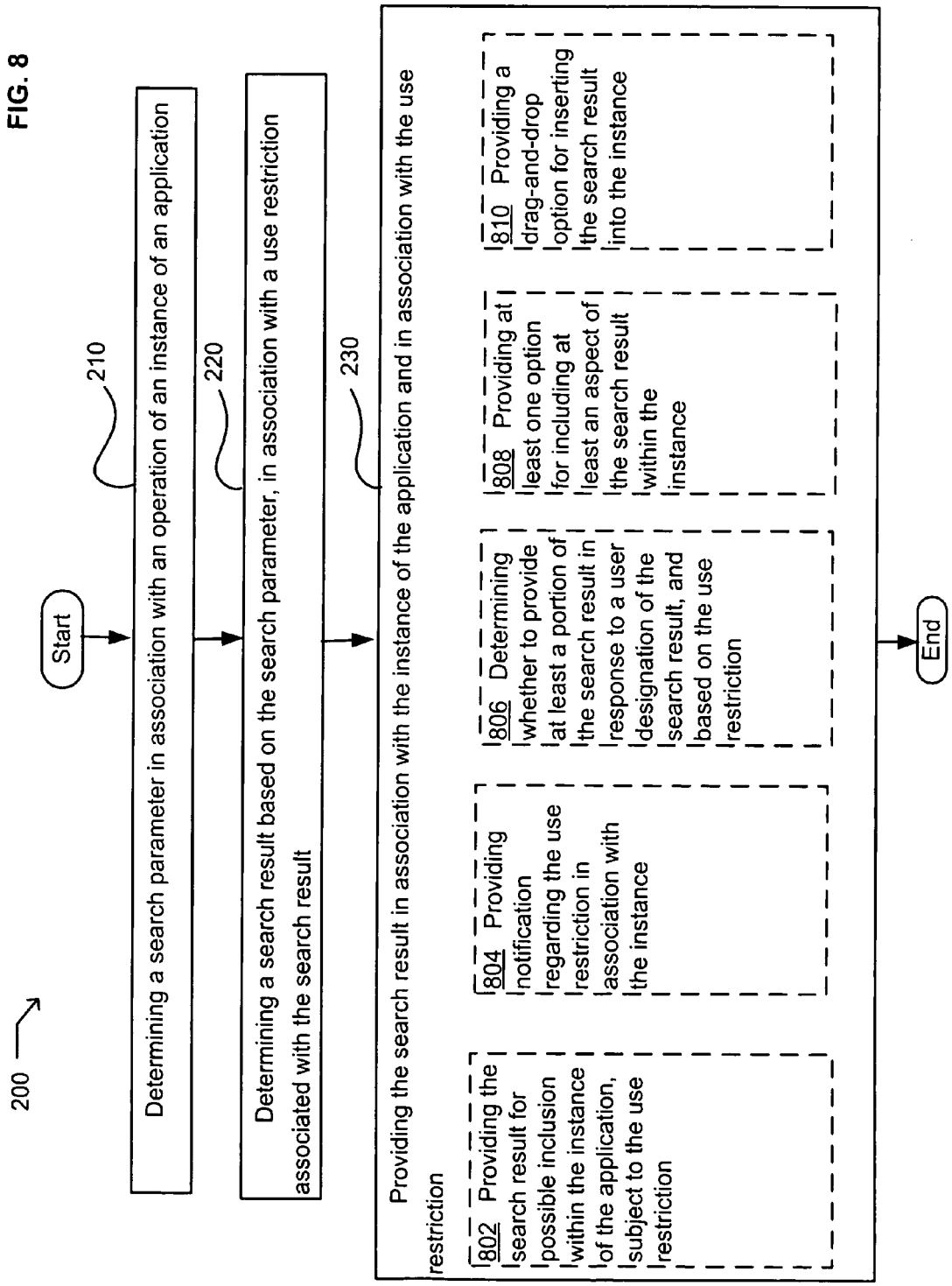
FIG. 8 illustrates an alternative embodiment of the example operational flow of FIG. 2.

FIG. 8 illustrates alternative embodiments of the example operational flow 200 of FIG. 2. FIG. 8 illustrates example embodiments where the providing operation 230 may include at least one additional operation. Additional operations may include an operation 802, an operation 804, an operation 806, an operation 808, and/or an operation 810.

At the operation 802, the search result may be provided for possible inclusion within the instance of the application, subject to the use restriction. For example, the providing logic 134 may provide the search result 124 and the use restriction within a pop-window displayed within a vicinity of the text 113, where, for example, the text 113 may be associated with the search parameter 115. In this way, the user 108 may view both the search result 124 and the use restriction 126 (e.g., a copyright notice associated with the search result 124, or a requirement for payment for inclusion of the search result 124 within the application instance 106), and may make a determination as to whether to include the search result 124 within the application instance 106. If the user 108 attempts to include or incorporate the search result 124 in violation of the use restriction 126, then the providing logic 134 may be operable to prevent such an inclusion, perhaps in conjunction with a notification regarding why the inclusion is not allowed.

At the operation 804, notification regarding the use restriction may be provided in association with the instance. For example, the providing logic 134 may provide a notification within the user interface 110 that informs the user 108 about the existence and/or nature of the use restriction 126. For example, where the search result 124 includes an image or video file, the providing logic 134 may provide a thumbnail or other restricted-use version of the search result 124 within the user interface 110, in association with the use restriction 126 that may include a caption or overlay for the thumbnail image and that informs the user 108 about a nature of the use restriction 126.

At the operation 806, it may be determined whether to provide at least a portion of the search result in response to a user designation of the search result, and based on the use restriction. For example, when the providing logic 134 and/or the providing rule 120 operate(s) to provide the search result 124 within the user interface 110, the search result 124 may include an image or video file. Then, the user 108 may designate or otherwise select the search result 124 for inclusion thereof in the application instance 106, e.g., by clicking on, highlighting, copying/pasting, dragging-or-dropping, or otherwise selecting the search result 124, and/or by designating a region of the application instance 106 at which the search result 124 is desired to be incorporated. In such cases, and in other cases, the providing logic 134 may be operable to determine that the user designation for inclusion is permitted, in whole or in part, by the use restriction 126. In a case where the use restriction 126 does, in fact, restrict the designated inclusion of the search result 124, the providing logic 134 may nonetheless include a partial inclusion. For example, where the search result 124 includes an image or video file, the providing logic 134 may allow for the inclusion of an associated thumbnail image. As another example, where the search result 124 includes an audio file, the providing logic 134 may permit inclusion of a short clip of the audio.

At the operation 808, at least one option is provided for including at least an aspect of the search result within the instance. For example, and continuing one or more of the examples just discussed, it may be the case that the providing logic 134 is operable to prevent inclusion of some or all of the search result 124 within the application instance 106. In such cases, the providing logic 134 may prevent the user 108 with one or more options for overcoming the use restriction 126, perhaps using the user interface 110. For example, the providing logic 134 may provide the user with the option(s) of paying for the inclusion of the search result 124, including an attribution of the content provider 128 in association with the search result 124, or contacting the content provider 128 to negotiate a manner in which the search result 124 may permissibly be included within the application instance 106.

At the operation 810, a drag-and-drop option for inserting the search result into the instance is provided. For example, the providing logic 134 may provide the search result 124 within the user interface 110, and may provide the user 108 with an ability to drag-and-drop the search result 124 to a desired location within the application instance 106, e.g., using a mouse or other input device. As should be understood, if an implementation of the drag-and-drop option is judged by the providing logic 134 to violate the use restriction 126, then the providing logic 134 may act to disallow the requested drag-and-drop option.

Figure 9:
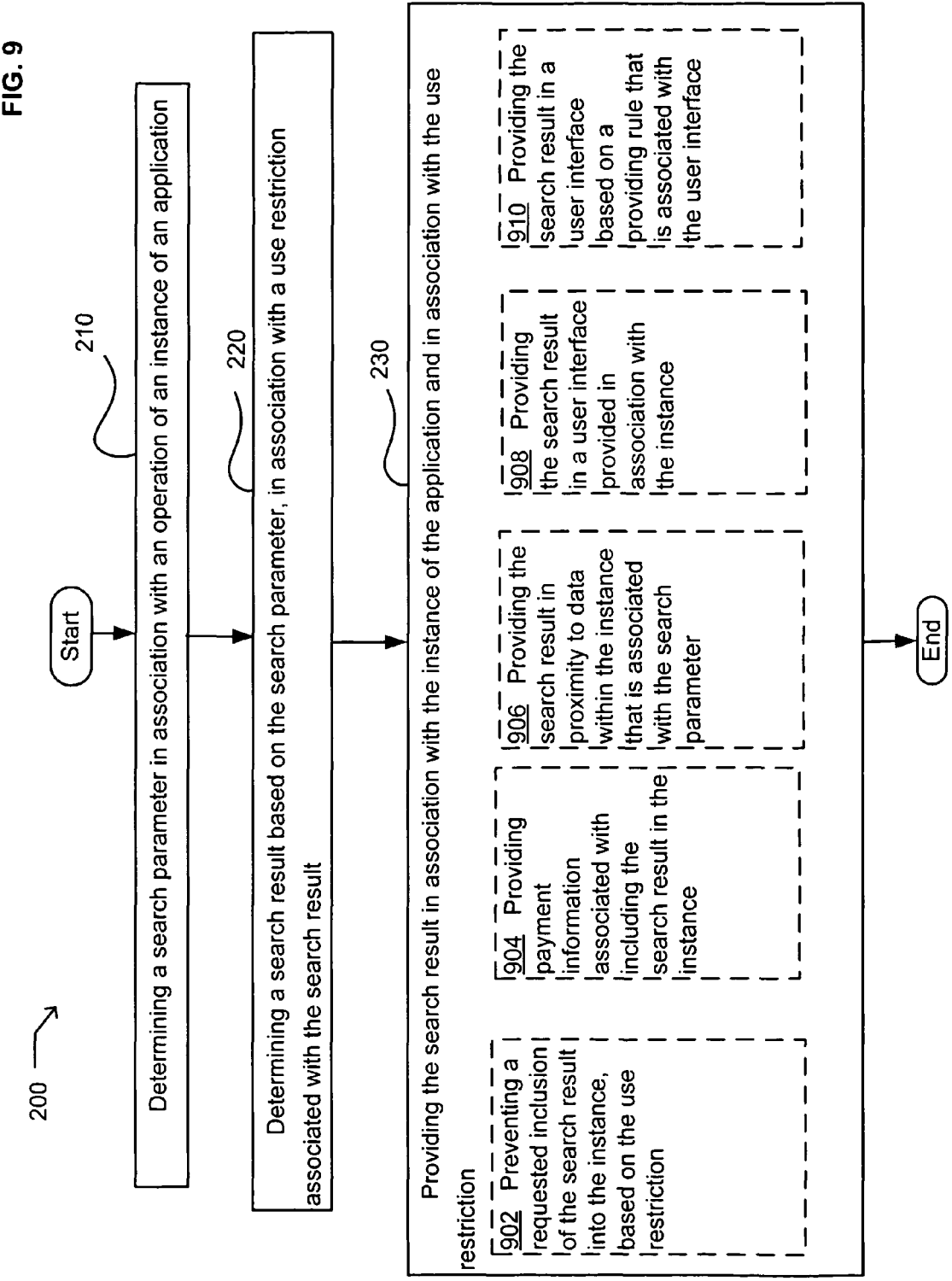
FIG. 9 illustrates an alternative embodiment of the example operational flow of FIG. 2.

FIG. 9 illustrates alternative embodiments of the example operational flow 200 of FIG. 2. FIG. 9 illustrates example embodiments where the providing operation 230 may include at least one additional operation. Additional operations may include an operation 902, an operation 904, an operation 906, an operation 908, and/or an operation 910.

At the operation 902, a requested inclusion of the search result into the instance is prevented, based on the use restriction. For example, the providing logic 134 may provide the search result 124 (and the use restriction 126) within the user interface 110. The use restriction may prevent inclusion of some or all of the search result 124 within the application instance 106. Accordingly, in response to a request by the user 108 to include the search result 124, the providing logic 134 may prevent such an inclusion, and, e.g., may provide a notification to the user 108 as to why the inclusion is not allowed, and/or may provide a notification as to how the user 108 may obtain permission to include some or all of the search result 124 (e.g., to comply with the use restriction).

At the operation 904, payment information associated with including the search result in the instance is provided. For example, the providing logic 134 may provide the search result 124 in conjunction with the use restriction 126 within the user interface 110, as shown, and also may include payment information (e.g., a vendor or amount) that may be used by the user 108 to comply with the use restriction and/or obtain permission to use some or all of the search result.

At the operation 906, the search result is provided in proximity to data within the instance that is associated with the search parameter. For example, the search parameter 115 may be associated with (e.g., determined by the determination rule 116 to be based on) the text 113. Then, the search result 124 may be provided in proximity to the text 113 within the application instance 106. For example, the search result 124 may be provided in a pop-up window next to the text 113, perhaps in response to a user selection of (e.g., by hovering over or right-clicking on) the text 113. In these implementations, the user interfaces 110, 112 may or may not be included. For example, the user 108 may designate (e.g., using the user preference data 136) that a first live search may be performed using such pop-up windows in proximity to related text, while a second live search may be performed using the user interface 110. Although the above example is provided with respect to the text 113, it should be understood that virtually any portion of the application instance 106 may be associated with the search parameter 115 and may serve as a proximate location for presentation of the search result 124.

At the operation 908, the search result is provided in a user interface provided in association with the instance. For example, the providing rule 120 may be used by the providing logic 134 in association with the user interface 110 to provide the search result 124. As described herein, each such user interface may be individually specified and customized to include different techniques for determining search parameters, determining search results and/or use restrictions based thereon, and/or providing the search results in association with the use restrictions. As a result, the user 108 may be provided with a plurality of unique instances of the user interfaces 110, 112, with each such user interface providing search results that may be useful to (and used by) the user in a different manner(s).

At the operation 910, the search result may be provided in a user interface based on a providing rule that is associated with the user interface. For example, the user interface 110 may be associated with the providing rule 120. As described herein, the providing rule 120 may relate, for example, to a manner in which the search result is provided within the user interface 110. For example, the providing rule 120 may specify that the search result 124 should be provided in the user interface for a certain amount of time before being replaced by a subsequent search result. The providing rule 120 also may specify whether and to what extent the use restriction 126 is included, illustrated, or implemented in association with the search result 124. The providing logic 120 also may specify a manner in which the search result 124 may, or may not, be included within the application instance 106. For example, the providing rule 120 may specify that the search result 124 may be included within the application instance by way of a drag-and-drop selection by the user 108, or may specify a manner or extent to which the use restriction prevents the search result 124 from being included within the application instance 106. In other examples, the providing rule 120 may provide a default incorporation rule for the user interface 110 (e.g., for quotations, the default incorporation rule may include an automatic inclusion of a footnote with an appropriate citation for the quotation).

Figure 10:
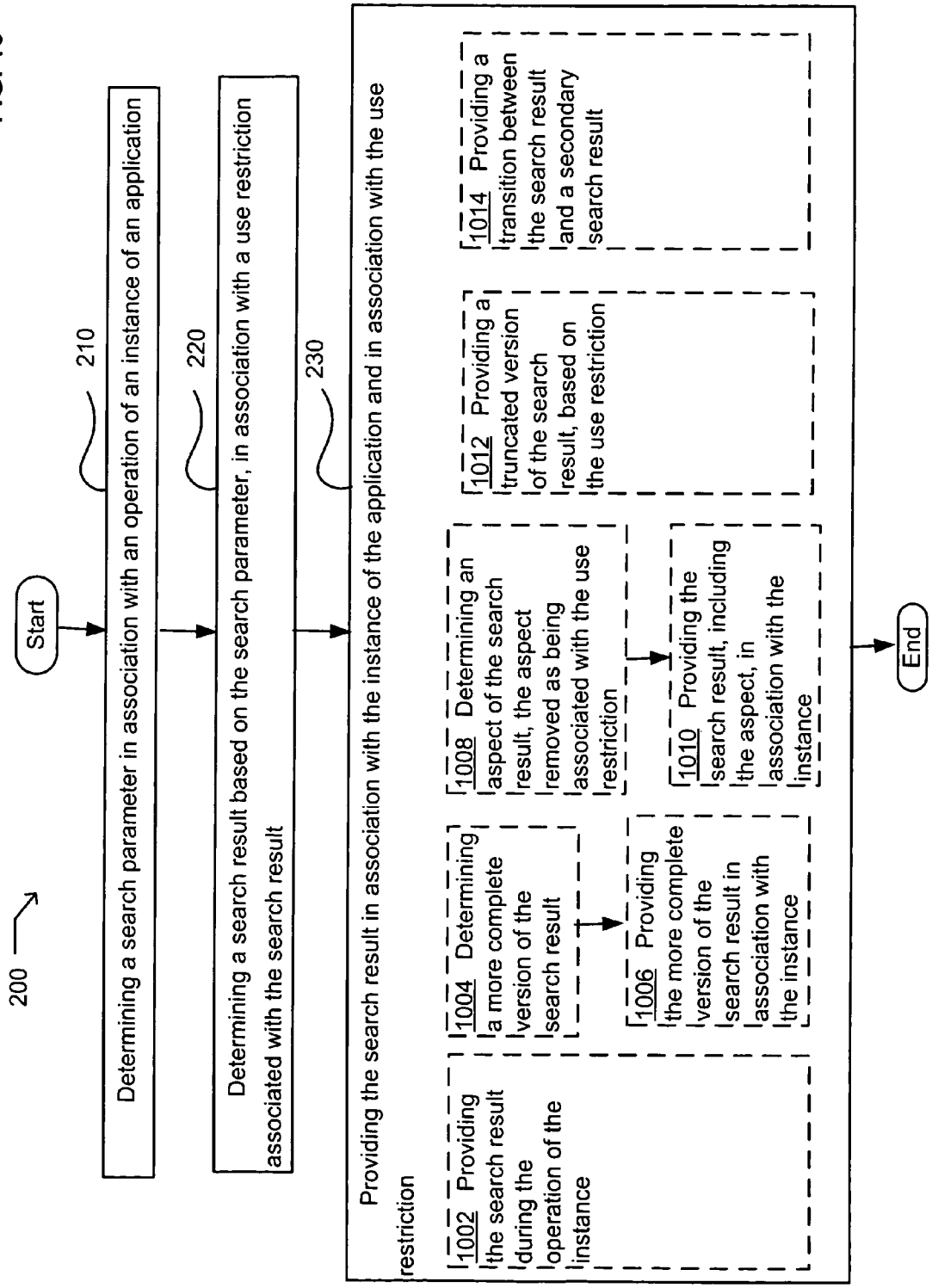
FIG. 10 illustrates an alternative embodiment of the example operational flow of FIG. 2.

FIG. 10 illustrates alternative embodiments of the example operational flow 200 of FIG. 2. FIG. 10 illustrates example embodiments where the providing operation 230 may include at least one additional operation. Additional operations may include an operation 1002, an operation 1004, an operation 1006, an operation 1008, an operation 1010, an operation 1012, and/or an operation 1014.

At the operation 1002, the search result is provided during the operation of the instance. For example, where the application instance 106 includes a text document associated with a word processing application (e.g., the application 104), then the operation of the application instance 106 may include preparation of the text document, such as, for example, entering the text 113 or providing the formatting 114, or executing the user interaction 142. Where the application instance 106 includes an image or video-editing file, then the operation of the application instance 106 may include, for example, selection of images or video clips, or placement of images or video clips on a storyboard. Thus, the search system 102 provides a live search that may be executed during the operation of the application instance 106 in an on-going and (at least seemingly) real-time and continuous manner. As such, the user 108 may be provided with useful and timely information that may be of assistance in preparing or completing the application instance 106.

At the operation 1004, a more complete version of the search result is determined. For example, where the search result 124 is initially presented in association with the application instance 106, it may be the case that the search result 124 includes only a partial, incomplete, or truncated version of a more complete search result (where, e.g., the lack of completeness of the search result 124 may be due to the use restriction 126). For example, the search result 124 may include a thumbnail image of a larger image or video file, or may include a partial quotation or passage from a larger text file (e.g., document or article). Accordingly, the providing logic 134 and/or the search logic 132 may determine the more complete version of the search result (e.g., the complete version of the image file, video file, or text file). Then, at the operation 1006 the more complete version of the search result may be provided in association with the instance. For example, and continuing the example(s) just given, the complete version of the image, video, or text file may be presented in association with the user interface 110, perhaps for inclusion thereof within the application instance 106.

At the operation 1008, an aspect of the search result is determined, the aspect removed as being associated with the use restriction. For example, as described herein, the search result 124 may be associated with an image or video file; however, an aspect of the search result 124 may be removed (e.g., by the providing logic 134) as being associated with the use restriction 126, so that, for example, only a thumbnail of the image or video file is actually provided within the user interface 110. At the operation 1010, the search result, including the aspect, may be provided in association with the instance. For example, and continuing the above example(s), the user 108 may obtain permission to include the search result 124 in its entirety within the application instance 106 (e.g., by virtue of a payment rendered, or by including certain disclaimers or attributions).

At the operation 1012, a truncated version of the search result may be provided, based on the use restriction. For example, the search result 124 may be provided (e.g., may be made accessible) in its entirety in association with the user interface 110. Nonetheless, for example, in response to an impermissible request for inclusion of the search result 124 within the application instance 106, the providing logic 134 may truncate the search result 124 and permit the inclusion of only a portion thereof within the application instance 106. For example, the search result 124 presented in the user interface 110 may include a link to an entirety of a newspaper or magazine article, but the providing logic 134 may prevent the inclusion of more than a designated passage or portion of the article within the application instance 106.

At the operation 1014, a transition between the search result and a secondary search result is provided. For example, as the user 108 operates the application instance 106, e.g., prepares a document or video, the search system 102 may dynamically and continuously provide updated search results. Accordingly, as each new search result is determined and provided, an action regarding a previous search result may be taken. For example, there may be a "fade-out" of the search result 124 as the secondary (e.g., subsequent) search result is provided. Additionally, or alternatively, the search result 124 may be saved to the search result data memory 138, for future viewing by the user 108, or by another user (e.g., when the user 108 scrolls back through a document included in the application instance 106, or when another user later receives and views the application instance 106). As the search result 124, and subsequent search results, is/are saved, a tab or other marker may be placed within, or otherwise provided in association with, the application instance 106, and/or the user interface(s) 110, 112, where each tab corresponds to one or more search result(s) and therefore allows the user 108 to quickly return to, and view, the previous search result(s). For example, selecting such a tab may cause the associated search result (and the associated use restriction) to re-appear within the user interface 110. As another example, each tab may be labeled with information regarding the search parameter 115 associated with that tab, and selecting a particular tab may allow the user 108 to navigate the content and/or context of the application instance 106, e.g., by taking the user 108 to a portion of the application instance associated with the selected tab). In still other examples, a scroll bar may be added to the user interface 110 to allow the user 108 to scroll back through a plurality of search results.

Figure 11:
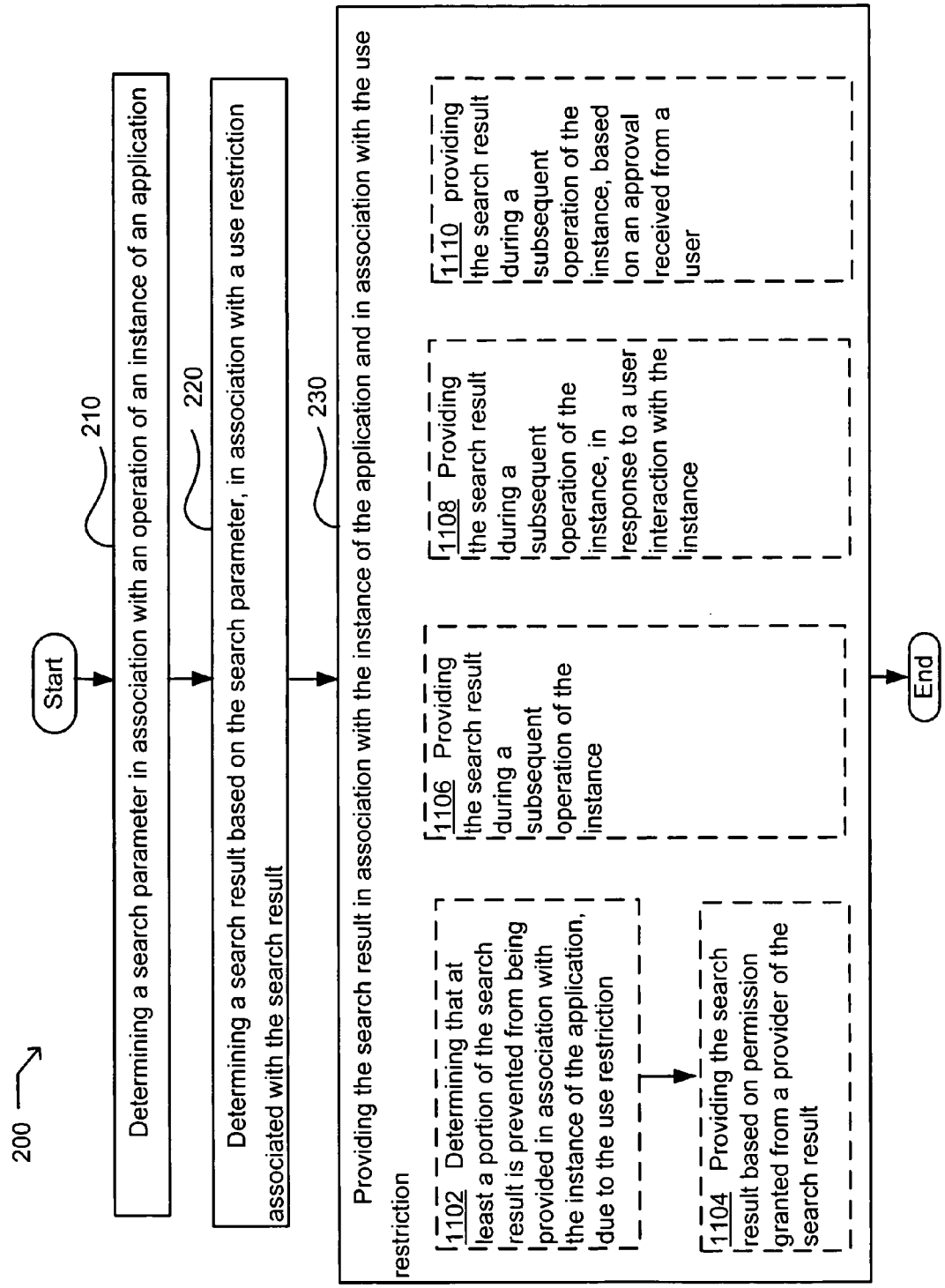
FIG. 11 illustrates an alternative embodiment of the example operational flow of FIG. 2.

FIG. 11 illustrates alternative embodiments of the example operational flow 200 of FIG. 2. FIG. 11 illustrates example embodiments where the providing operation 230 may include at least one additional operation. Additional operations may include an operation 1102, an operation 1104, an operation 1106, an operation 1108, and/or an operation 1110.

At the operation 1102, at least a portion of the search result is determined to be prevented from being provided in association with the instance of the application, due to the use restriction. For example, as described herein, the search result 124 may include an audio file, and the use restriction 126 may allow only a portion of the audio file to be heard or included within the application instance 106, so that remaining portion (s) of the audio file are prevented from being provided in association with the application instance 106. At the operation 1104, the search result is provided based on permission granted from a provider of the search result. For example, the user 108 may negotiate with, or otherwise communicate with, the content provider 128, so as to obtain permission to provide the search result 124 in its entirety (or at least to provide additional portions thereof). As another example, the search result 124 may include a video file that the user 108 wishes to review or otherwise write about, and the user 108 may be prevented from including the video file within the application instance 106 by the use restriction 126. In this example, the user 108 may communicate with the content provider 128 to obtain permission to incorporate certain designated portions of the video file (e.g., certain designated still images or thumbnails) within the application instance 106.

At the operation 1106, the search result is provided during a subsequent operation of the instance. For example, the user 108 may complete a document included in the application instance 106, and the document may be stored, perhaps in association with the search result data 128. Thereafter, when the user 108, or another user, accesses the document (and associated search result(s)), such a user may review both the original content created by the user 108, in association with the search results that were obtained during the creation of the document. During this subsequent operation, the same or different queries (e.g., based on the search parameter 115) may be re-executed in whole or in part, and/or may be corrected.

At the operation 1108, the search result may be provided during a subsequent operation of the instance, in response to a user interaction with the instance. For example, and similar to the example(s) just given, the user 108, or another user, may open a document included in the application instance 106 and previously created by the user 108. In this example (s), such a user may simply view the document without viewing any of the search results obtained by the search system during the creation (or subsequent editing) of the document. Nonetheless, based on certain user interactions with the document being viewed, such as, for example, a selection of, clicking on, or hovering over of a certain text passage, or element, the user may be provided with some or all of the search results, e.g., the search results for the text, passage, or element being selected that were obtained during the creation of the document.

At the operation 1110, the search result is provided during a subsequent operation of the instance, based on an approval received from a user. For example, it should be understood that as the user 108 creates a document included within the application instance 106, many different types and examples of search results may be provided, e.g., within the user interfaces 110, 112. However, the user 108 may or may not wish to include a particular search result for storage in the search result data 138. That is, the search system 102 may be configured such that search results provided in the user interface 110 are automatically discarded or deleted as a new, subsequent search result is obtained, unless the user 108 designates otherwise (e.g., designates that the search result should be included in the search result data 138). As a result, the final version of the created document may be associated with some, but not all, of the search results generated during the creation of the document.

Figure 12:
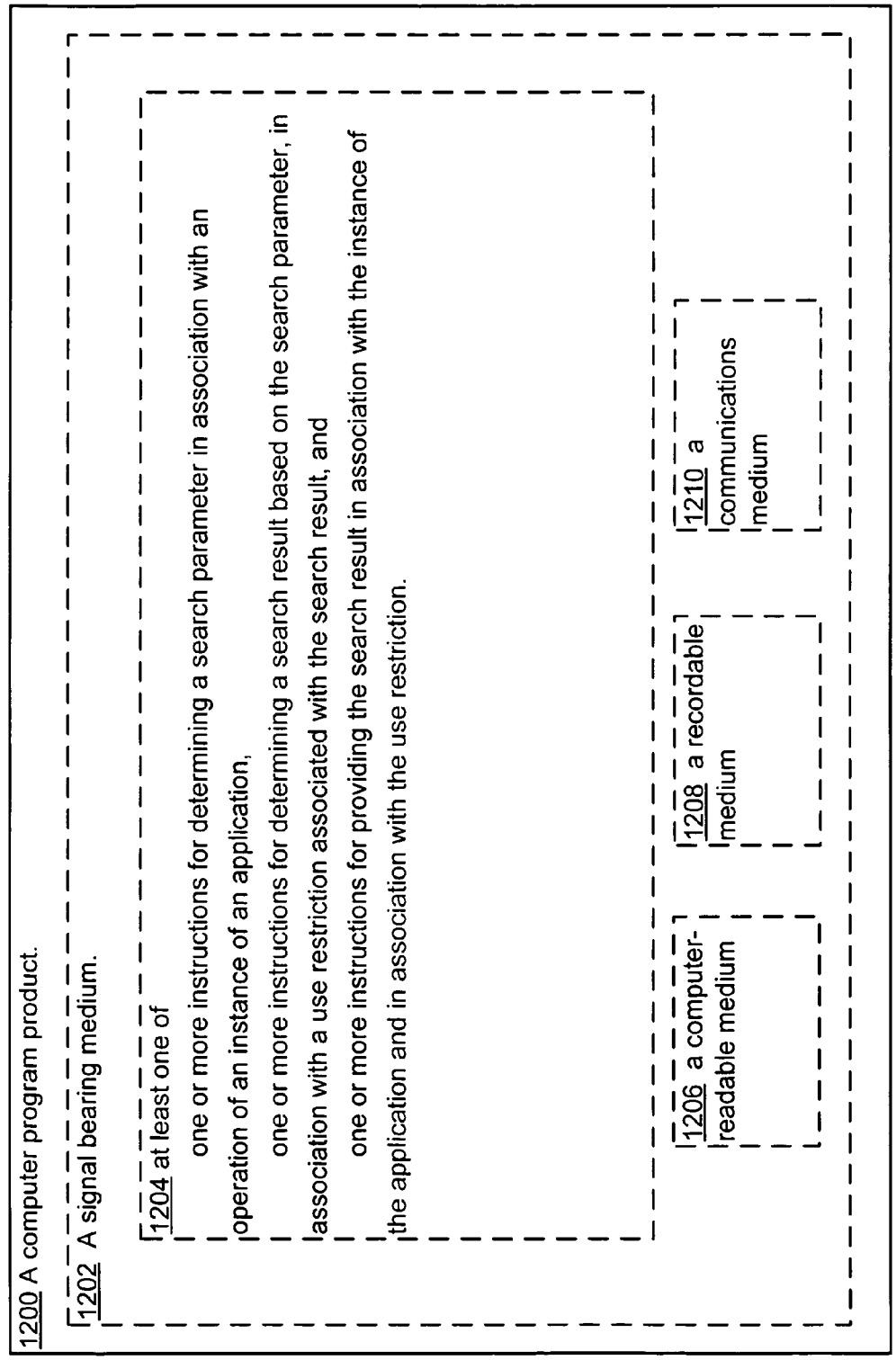
FIG. 12 illustrates a partial view of an example computer program product that includes a computer program for executing a computer process on a computing device.

FIG. 12 illustrates a partial view of an example computer program product 1200 that includes a computer program 1204 for executing a computer process on a computing device. An embodiment of the example computer program product 1200 is provided using a signal bearing medium 1202, and may include at least one of one or more instructions for determining a search parameter in association with an operation of an instance of an application, the signal bearing medium also bearing one or more instructions for determining a search result based on the search parameter, in association with a use restriction associated with the search result, and the signal bearing medium also bearing one or more instructions for providing the search result in association with the instance of the application and in association with the use restriction. The one or more instructions may be, for example, computer executable and/or logic-implemented instructions. In one implementation, the signal-bearing medium 1202 may include a computer-readable medium 1206. In one implementation, the signal bearing medium 1202 may include a recordable medium 1208. In one implementation, the signal bearing medium 1202 may include a communications medium 1210.

Figure 13:
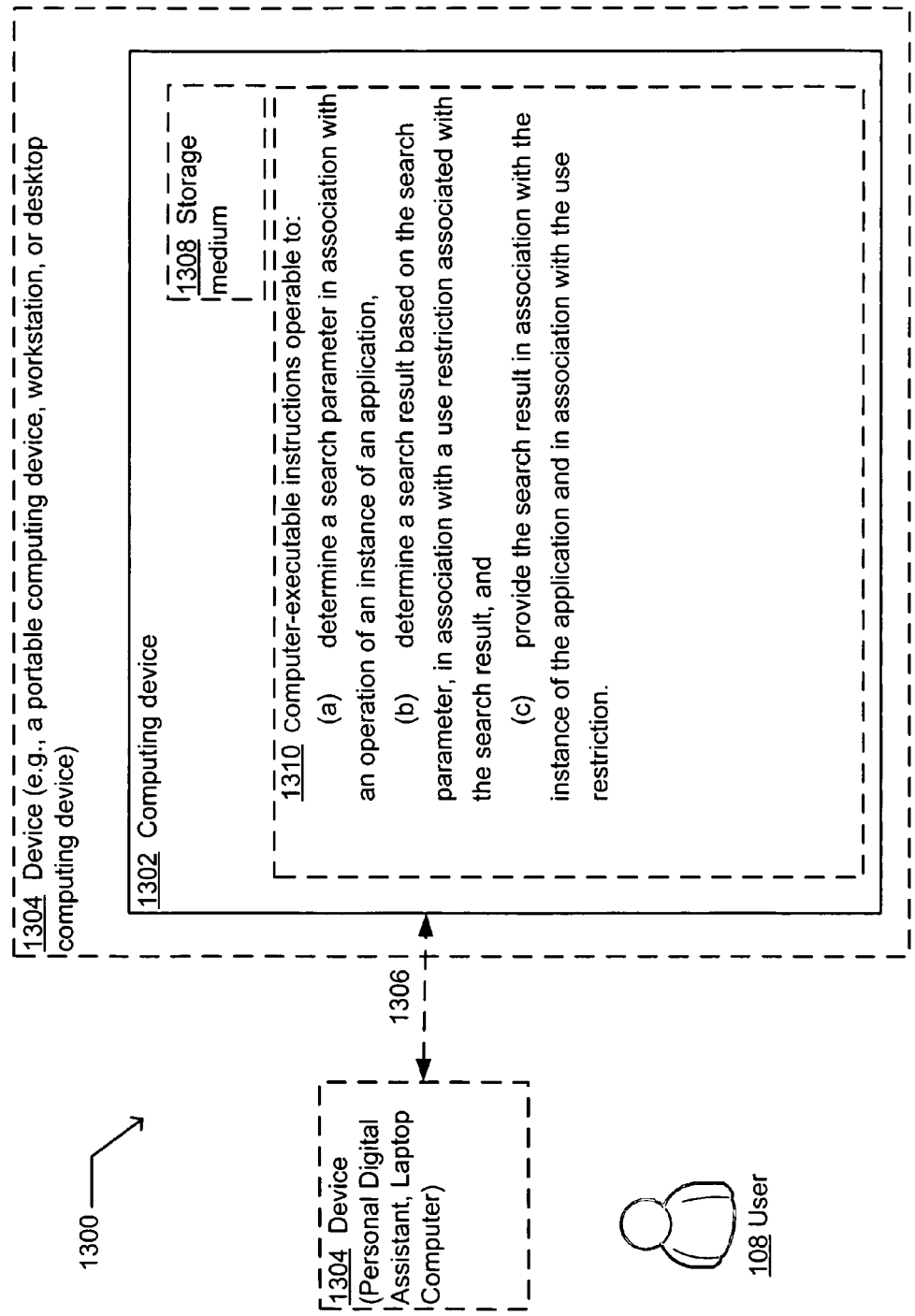
FIG. 13 illustrates an example system in which embodiments may be implemented.

FIG. 13 illustrates an example system 1300 in which embodiments may be implemented. The system 1300 includes a computing system environment. The system 1300 also illustrates the user 108 using a device 1304, which is optionally shown as being in communication with a computing device 1302 by way of an optional coupling 1306. The optional coupling 1306 may represent a local, wide-area, or peer-to-peer network, or may represent a bus that is internal to a computing device (e.g., in example embodiments in which the computing device 1302 is contained in whole or in part within the device 1304). A storage medium 1308 may be any computer storage media.

The computing device 1302 includes computer-executable instructions 1310 that when executed on the computing device 1302 cause the computing device 1302 to determine a search parameter in association with an operation of an instance of an application, determine a search result based on the search parameter, in association with a use restriction associated with the search result, and provide the search result in association with the instance of the application and in association with the use restriction.

In FIG. 13, then, the system 1300 includes at least one computing device (e.g., 1302 and/or 1304). The computer-executable instructions 1310 may be executed on one or more of the at least one computing device. For example, the computing device 1302 may implement the computer-executable instructions 1310 and output a result to (and/or receive data from) the computing device 1304. Since the computing device 1302 may be wholly or partially contained within the computing device 1304, the computing device 1304 also may be said to execute some or all of the computer-executable instructions 1310, in order to be caused to perform or implement, for example, various ones of the techniques described herein, or other techniques.

The device 1304 may include, for example, one or more of a personal digital assistant (PDA), a laptop computer, a tablet personal computer, a networked computer, a computing system comprised of a cluster of processors, a workstation computer, and/or a desktop computer. In another example embodiment, the device 1304 may be operable to communicate with the computing device 1302 to communicate with a database (e.g., implemented using the storage medium 1308) to determine and/or provide the search parameter 114, the search result 124 and/or the use restriction 126.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system comprising:
   circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application; and
   circuitry for providing at least one search result based on the at least one search parameter in association with the at least one instance of the application, the at least one search result enabled with drag-and-drop capability for including at least some of the at least one search result as content associated with the at least one instance of the at least one application.

2. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
   circuitry for determining at least one search parameter associated with operation of at least one instance of at least one application by determining whether at least one textual term associated with operation of the at least one instance of the at least one application is associated with at least one specified character format, and, if the at least one textual term associated with operation of the at least one instance of the at least one application is associated with at least one specified character format, determining at least one search parameter from the at least one textual term associated with operation of the at least one instance of the at least one application.

3. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
  circuitry for determining at least one search parameter associated with operation of at least one instance of at least one application by determining whether data input into at least one instance of the at least one application is associated with at least one specified character format, and, if the data input into the at least one instance of the at least one application is associated with at least one specified character format, determining at least one search parameter from the data input into the at least one instance of the at least one application.

4. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
  circuitry for determining at least one search parameter associated with operation of at least one instance of at least one application by determining whether at least one term associated with operation of the at least one instance of the at least one application is associated with at least one specified font format, and, if the at least one term associated with operation of the at least one instance of the at least one application is associated with at least one font format, determining at least one search parameter from the at least one term associated with operation of the at least one instance of the at least one application.

5. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application circuitry comprises:
  circuitry for determining at least one search parameter associated with operation of at least one instance of at least one application by determining whether at least one term associated with operation of the at least one instance of the at least one application is associated with at least one specified language format, and, if the at least one term associated with operation of the at least one instance of the at least one application is associated with at least one specified language format, determining at least one search parameter from the at least one term associated with operation of the at least one instance of the at least one application.

6. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
  circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter as the at least one term associated with operation of the at least one instance of the at least one application.

7. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
  circuitry for determining at least one search parameter associated with operation of at least one instance of at least one application by determining whether at least one term associated with operation of the at least one instance of the at least one application is associated with at least one specified character, and, if the at least one term associated with operation of the at least one instance of the at least one application is associated with at least one specified character, determining at least one search parameter from the at least one term associated with operation of the at least one instance of the at least one application.

8. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
  circuitry for determining at least one search parameter associated with operation of at least one instance of at least one application by determining at one or more intervals whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application.

9. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
   circuitry for determining at least one search parameter associated with operation of at least one instance of at least one application by determining whether at least one term associated with operation of the at least one instance of the at least one application is associated with at least one specified character format determined from at least one potential audience, and, if the at least one term associated with operation of the at least one instance of the at least one application is associated with at least one specified character format, determining at least one search parameter from the at least one term associated with operation of the at least one instance of the at least one application.

10. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
   circuitry for determining at least one search parameter associated with operation of at least one instance of at least one application by determining whether at least one term associated with operation of the at least one instance of the at least one application is associated with at least one specified character format determined based on at least one potential user, and, if the at least one term associated with operation of the at least one instance of the at least one application is associated with at least one specified character format, determining at least one search parameter from the at least one term associated with operation of the at least one instance of the at least one application.

11. The system of claim 1, wherein the circuitry for determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application comprises:
   circuitry for determining at least one search parameter associated with operation of at least one instance of at least one application by determining whether at least one term associated with operation of the at least one instance of the at least one application is associated with at least one specified character format determined from user-selection, and, if the at least one term associated with operation of the at least one instance of the at least one application is associated with at least one specified character format, determining at least one search parameter from the at least one term associated with operation of the at least one instance of the at least one application.

12. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
   circuitry for providing at least one search result based on at least one search performed using the at least one search parameter in association with the at least one instance of the application, the at least one search result enabled with drag-and-drop capability for including at least some of the at least one search result as content associated with the at least one instance of the at least one application.

13. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
   circuitry for providing at least one search engine result based on the at least one search parameter in association with the at least one instance of the application, the at least one search result enabled with drag-and-drop capability for including at least some of the at least one search result as content associated with the at least one instance of the at least one application.

14. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
   circuitry for providing at least one search result based on the at least one search parameter and at least one search rule in association with the at least one instance of the application, the at least one search result enabled with drag-and-drop capability for including at least some of the at least one search result as content associated with the at least one instance of the at least one application.

15. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:

circuitry for providing at least one search result based on the at least one search parameter and at least one user-specified search rule in association with the at least one instance of the application, the at least one search result enabled with drag-and-drop capability for including at least some of the at least one search result as content associated with the at least one instance of the at least one application.

16. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter and at least one restriction rule in association with the at least one instance of the application, the at least one search result enabled with drag-and-drop capability for including at least some of the at least one search result as content associated with the at least one instance of the at least one application.

17. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application, the at least one search result having at least one use restriction and enabled with drag-and-drop capability for including at least some of the at least one search result as content associated with the at least one instance of the at least one application.

18. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application and at least one use restriction notice, the at least one search result enabled with drag-and-drop capability for including at least some of the at least one search result as content associated with the at least one instance of the at least one application.

19. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application, the at least one search result enabled with drag-and-drop capability for including for at least one fee at least some of the at least one search result as content associated with the at least one instance of the at least one application.

20. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application, the at least one search result enabled with drag-and-drop capability for including upon authorization at least some of the at least one search result as content associated with the at least one instance of the at least one application.

21. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application, the at least one search result enabled with drag-and-drop capability for including subject to at least one use restriction at least some of the at least one search result as content associated with the at least one instance of the at least one application.

22. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in proximity to the at least one term associated with operation of the at least one instance of the at least one application, the at least one search result enabled with drag-and-drop capability for including at least some of the at least one search result as content associated with the at least one instance of the at least one application.

23. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter within at least one separate window from the at least one instance of the application, the at least one search result enabled with drag-and-drop capability for including at least some of the at least one search result as content associated with the at least one instance of the at least one application.

24. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application and in accordance with at least one user-specified rule, the at least one search result enabled with drag-and-drop capability for including at least some of the at least one search result as content associated with the at least one instance of the at least one application.

25. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter during operation of the at least one instance of the application, the at least one search result enabled with drag-and-drop capability for including at least some of the at least one search result as content associated with the at least one instance of the at least one application.

26. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application, the at least one search result enabled with drag-and-drop capability for including at least one truncated version of the at least one search result as content associated with the at least one instance of the at least one application.

27. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application, the at least one search result enabled with drag-and-drop capability for including at least one use-restriction-based truncated version of the at least one search result as content associated with the at least one instance of the at least one application.

28. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result and at least one secondary search result based on the at least one search parameter in association with the at least one instance of the application, the at least one search result enabled with drag-and-drop capability for including at least some of the at least one search result as content associated with the at least one instance of the at least one application.

29. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application and at least one subsequent instance of the application, the at least one search result enabled with drag-and-drop capability for including at least some of the at least one search result as content associated with the at least one instance of the at least one application.

30. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one source citation based on the at least one search parameter in association with the at least one instance of the application, the at least one source citation enabled with drag-and-drop capability for including at least some of the at least one source citation as content associated with the at least one instance of the at least one application.

31. The system of claim 1, wherein the circuitry for providing at least one search result based on the at least one search parameter in association with the at least one instance of the application, the at least one search result enabled with drag-and-drop capability for including at least some of the at least one search result as content associated with the at least one instance of the at least one application comprises:
circuitry for providing at least one search result based on the at least one search parameter in association with the at least one instance of the application, the at least one search result enabled with drag-and-drop capability for including at least some of the at least one search result as at least one footnote associated with the at least one instance of the at least one application.

32. A system comprising:
determination logic for determining, using at least some circuitry, at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application; and
providing logic for providing at least one search result based on the at least one search parameter in association with the at least one instance of the application, the at least one search result enabled with drag-and-drop capability for including at least some of the at least one search result as content associated with the at least one instance of the at least one application.

33. A method comprising:
determining, using at least some circuitry, at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application; and providing at least one search result based on the at least one search parameter in association with the at least one instance of the application, the at least one search result enabled with drag-and-drop capability for including at least some of the at least one search result as content associated with the at least one instance of the at least one application.

34. One or more computer readable media including one or more instructions for facilitating operations comprising:

determining at least one search parameter associated with operation of at least one instance of at least one application by determining whether at least one term associated with operation of the at least one instance of the at least one application is associated with at least one specified character format, and, if the at least one term associated with operation of the at least one instance of the at least one application is associated with at least one specified character format, determining at least one search parameter from the at least one term associated with operation of the at least one instance of the at least one application; and providing at least one search result based on the at least one search parameter in association with the at least one instance of the application, the at least one search result enabled with drag-and-drop capability for including at least some of the at least one search result as content associated with the at least one instance of the at least one application.

\* \* \* \* \*